(12) United States Patent
Iwamura

(10) Patent No.: US 7,650,511 B2
(45) Date of Patent: Jan. 19, 2010

(54) INFORMATION PROCESSING METHOD, FALSIFICATION VERIFICATION METHOD AND DEVICE, STORAGE MEDIUM, AND PROGRAM

(75) Inventor: Keiichi Iwamura, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 765 days.

(21) Appl. No.: 11/352,240

(22) Filed: Feb. 13, 2006

(65) Prior Publication Data
US 2007/0172256 A1 Jul. 26, 2007

(30) Foreign Application Priority Data
Feb. 23, 2005 (JP) .............................. 2005-047601

(51) Int. Cl.
H04L 9/32 (2006.01)
H04L 9/00 (2006.01)
(52) U.S. Cl. ...................... 713/192; 713/193; 713/194; 380/277; 380/44
(58) Field of Classification Search ......... 380/277–282, 380/285, 44, 28–30; 713/168, 187, 189, 713/190, 192–194; 726/26
See application file for complete search history.

(56) References Cited

U.S. PATENT DOCUMENTS

| 5,325,433 | A | * | 6/1994 | Torii et al. ...................... 380/30 |
| 5,499,294 | A | | 3/1996 | Friedman ........................ 380/10 |
| 6,968,058 | B1 | | 11/2005 | Kondoh et al. ................. 380/200 |
| 7,162,637 | B2 | | 1/2007 | Wakao et al. .................. 713/176 |
| 2003/0123699 | A1 | | 7/2003 | Wakao et al. ................. 382/100 |
| 2005/0091497 | A1 | | 4/2005 | Wakao ........................... 713/176 |
| 2006/0253448 | A1 | | 11/2006 | Tagashira et al. ................ 707/9 |

FOREIGN PATENT DOCUMENTS

| CN | 1430411 | 7/2003 |
| CN | 1482574 | 3/2004 |
| EP | 1 326 424 A | 7/2003 |
| JP | 11-308564 | 11/1999 |
| JP | 2004-40307 | 2/2004 |
| JP | 2004-140622 | 5/2004 |
| KR | A 1020010069575 | 7/2001 |

OTHER PUBLICATIONS

Notice of Allowance issued Nov. 30, 2007 in Korean Application No. 10-2006-0017098.
Chinese Office Action issued Feb. 15, 2008, in Chinese Application No. 2006100088658, and English-language translation.
Wenbo, Mao: "Modern Cryptography, Theory & Practice", 2004, Prentice Hall PTR, pp. 434-457.

* cited by examiner

*Primary Examiner*—Hosuk Song
(74) *Attorney, Agent, or Firm*—Fitzpatrick, Cella, Harper & Scinto

(57) ABSTRACT

The secret data is acquired externally by making an arithmetic operation between unique information of an apparatus and the first information managed secretly, and secretly held as key data in a key holding part. A MAC generation part generates the authentication data based on a hash value obtained from the data to be protected and the key data held in the key holding part 21. An image file generation part generates an image file to provide the unique information and the authentication data together with the data to be protected.

9 Claims, 23 Drawing Sheets

FIG. 8
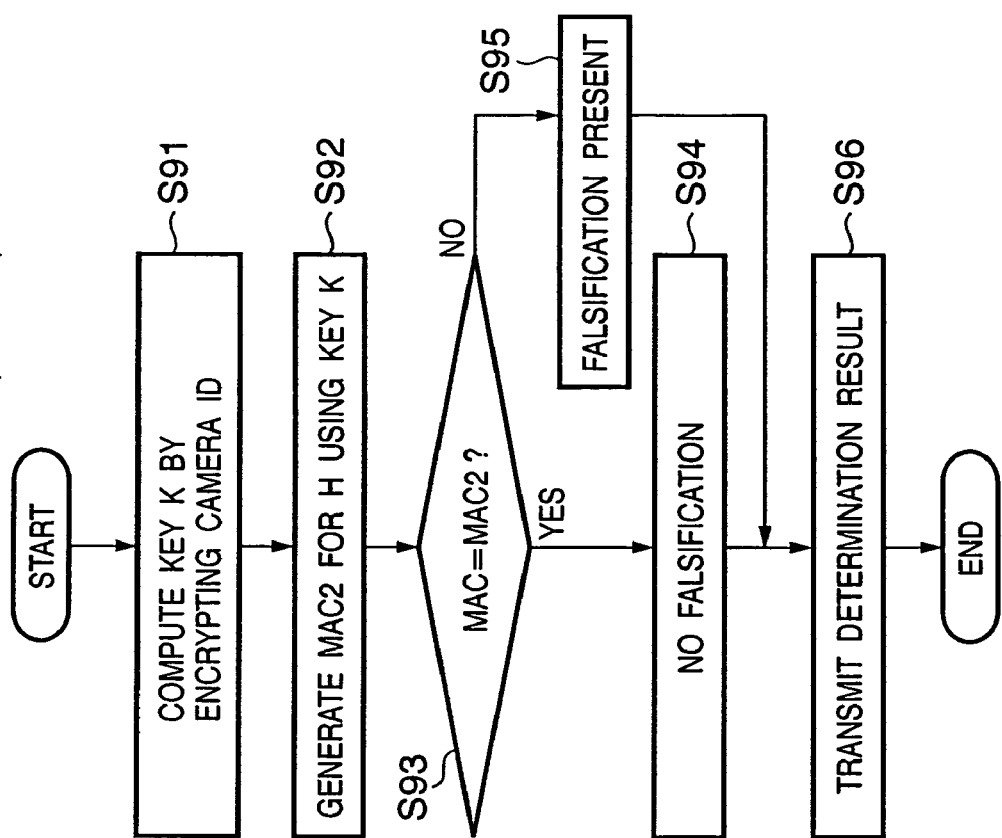
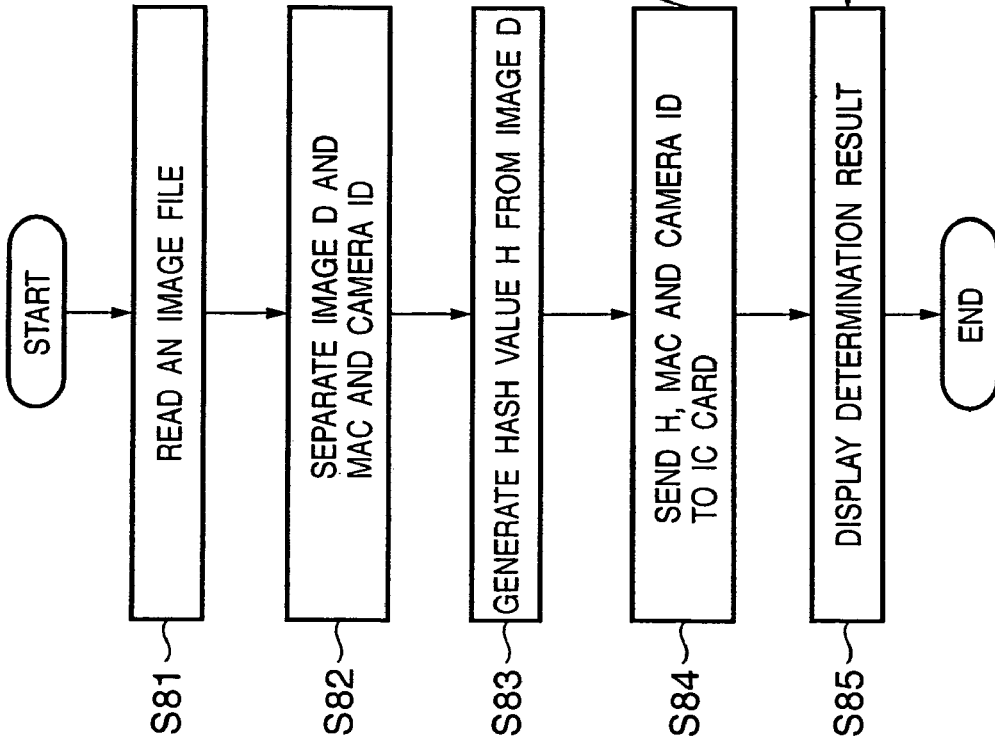

INFORMATION PROCESSING METHOD, FALSIFICATION VERIFICATION METHOD AND DEVICE, STORAGE MEDIUM, AND PROGRAM

FIELD OF THE INVENTION

The present invention relates to an information processing technology for determining the presence or absence of data falsification. Particularly, the invention is suitable for the technology for assuring the completeness (no alteration) of an image file.

BACKGROUND OF THE INVENTION

In recent years, a digital camera has broadly spread in which an optical image is converted through a lens into electric signal by a sensor such as CCD or CMOS, and the acquired data is saved in the digital format.

The digital camera has various merits that not only a labor of developing and printing a photographed image can be saved, as in the conventional silver halide photography, but also there is no aged deterioration, the image is easily stored or retrieved, and data can be transmitted to the remote site through the telecommunication line. Therefore, the digital camera is utilized in many business fields.

However, some demerits of digitalization are pointed out. They are caused by a feature that the digital image is easily processed or corrected by employing a photo retouch tool available on the market.

Accordingly, there is a need for a scheme that overcomes the shortcoming of the digital image that the image alteration is easy.

At present, a falsification detection system for the image data based on the digital signature with an encryption technology has been proposed. For instance, the system as proposed in the U.S. Pat. No. 5,499,294 comprises an image generation apparatus (camera) that generates the image data and an image verification apparatus that verifies the completeness of the image data. This image generation apparatus generates the digital signature data that is information identifying the image data (detecting the falsification) by performing a predetermined arithmetic operation based on the secret information unique to the image generation apparatus and the digital image data photographed by the image generation apparatus. And the generated digital signature data and the digital image data are outputted from the image generation apparatus. On the other hand, the image verification apparatus makes the verification by comparing the resultant data of performing a predetermined arithmetic operation on the digital image data and the resultant data of performing a reverse generation operation on the digital signature data. A hash function (compressibility function) and the public key encryption are employed for generating the digital signature data in the U.S. Pat. No. 5,499,294.

A MAC (Message Authentication Code) may be employed, instead of the digital signature data. The MAC is generated using a shared key encryption and the hash function, and has a feature that the processing speed is higher than the public key encryption. However, it is required that the shared key used for generating or verifying the MAC is managed strictly in the image verification apparatus.

The image data photographed by the camera is usually memorized in a small memory card (nonvolatile memory) connected with the camera, and the memory card is composed chiefly of a flash EEPROM. Moreover, in addition to the flash EEPROM, a memory card or IC card with a security function having an arithmetic operation part composed of CPU, RAM, and ROM has been put to practical use. With these arithmetic operation functions, the data for falsification detection such as the digital signature data can be generated outside the image generation apparatus (i.e., inside the memory card or IC card).

In the following, a system for detecting the falsification by using the MAC or digital signature for the image generation apparatus such as the camera will be considered. The MAC is the scheme for creating the verification data by using the shared key encryption and verifying it, as previously described. However, if the shared key is known, the safety can not be assured. Also, in the digital signature, if the private key used for the signature is known, the safety is not warranted. Hence, when the camera is on the creation side of the verification data and the IC card is on the verification side, the image generation apparatus such as the camera is weaker in the security performance than the IC card.

SUMMARY OF THE INVENTION

This invention has been achieved in the light of the above-mentioned problems, and it is an object of the invention to improve the security performance for the falsification of data.

According to one aspect of the present invention, there is provided an information processing apparatus for providing data including the information for falsification detection, comprising: an acquisition unit configured to acquire the secret data obtained by arithmetic operation between the unique information of the apparatus and the first information managed secretly; a holding unit configured to acquire and hold secretly the key data based on the secret data acquired by the acquisition unit; a generation unit configured to generate the authentication data based on the data to be protected and the key data held in the holding unit; and a providing unit configured to provide the unique data and the authentication data together with the data to be protected.

Also, according to another aspect of the present invention, there is provided an information processing method for providing data including the information for falsification detection, comprising: a holding step of acquiring the secret data from an external apparatus by making an arithmetic operation between the unique information of an apparatus and the first information managed secretly in the external apparatus and holding secretly the key data based on the secret data in a memory; a generation step of generating the authentication data based on the data to be protected and the key data held in the memory; and a providing step of providing the unique information and the authentication data together with the data to be protected.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 8 is a flowchart for explaining a MAC verification process according to the first embodiment;

DETAILED DESCRIPTION OF THE PREFERRED EMBODIMENTS

Preferred embodiments of the present invention will now be described in detail in accordance with the accompanying drawings.

First Embodiment

In the following embodiment, the image data is described as the data to be protected, namely, the data subjected to falsification detection. It will be apparent to those skilled in the art that a system of this embodiment may handle the data in another form as the data to be protected.

[System Configuration]

Figure 1:
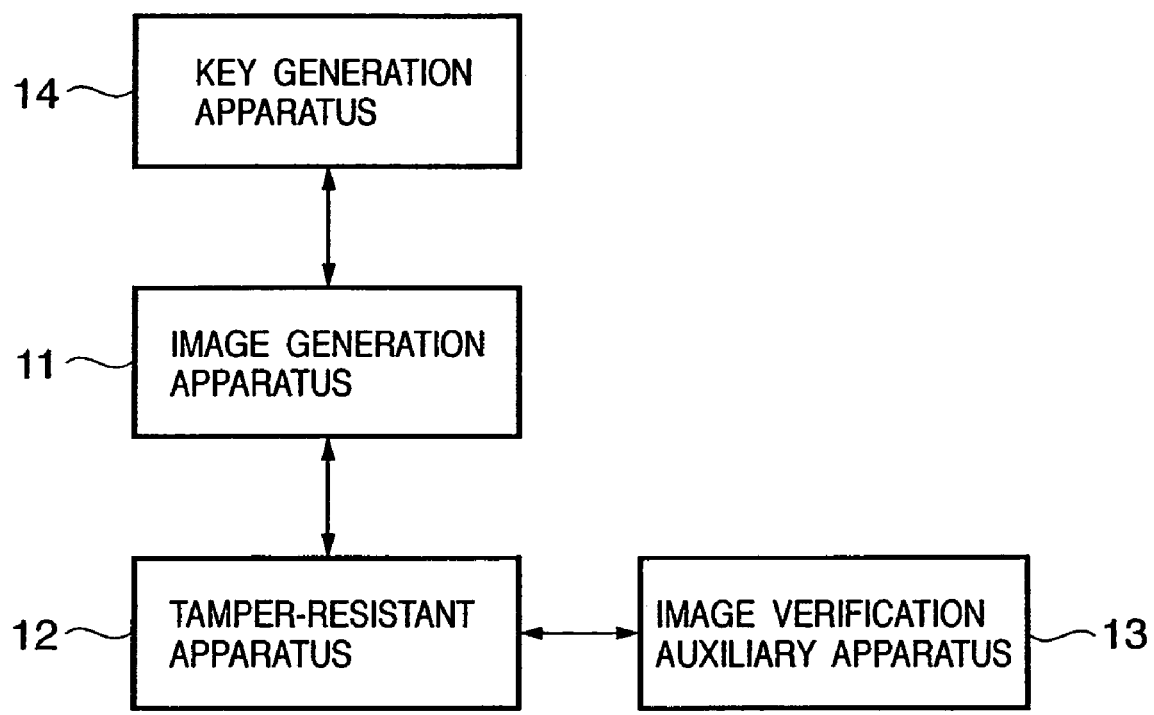
FIG. 1 is a block diagram for explaining one configuration example of an image verification system according to an embodiment of the present invention.

A system of this embodiment comprises an image generation apparatus 11, a tamper-resistant apparatus 12, an image verification auxiliary apparatus 13, and a key generation apparatus 14, as shown in FIG. 1.

The image generation apparatus 11 outputs the data to be protected (image data in this embodiment) together with the authentication data for falsification detection (MAC in this embodiment). The image generation apparatus 11 has a function of setting and/or holding a key for MAC creation, a function of generating the image data from a photographed image, a function of generating the MAC data for generated image data, a function of generating the auxiliary parameters (e.g., in the case of a camera, photographing time, focal distance, f-number, ISO speed, photometry mode, image file size and photographer information), a function of generating an image file with MAC data (composed of image data, MAC data, auxiliary parameters and so on), and a function of making the communications with the tamper-resistant apparatus 12. The image generation apparatus 11 may be an image pickup apparatus such as a digital camera or a digital video camera, a scanner, an electronic apparatus having a camera unit, or the apparatus for generating the digital image. For simplicity, the image generation apparatus 11 is described as a digital camera in this embodiment.

The tamper-resistant apparatus 12 stores the data to be protected (image file) generated in the image generation apparatus 11, and determines the presence or absence of falsification of data. The tamper-resistant apparatus 12 has a function of storing the image file generated in the image generation apparatus 11, a function of computing the information necessary for verification, and a function of communicating the data with the image generation apparatus 11 or the image verification auxiliary apparatus 13. The tamper-resistant apparatus 12 may be a memory card or IC card with security function having an arithmetic operation unit composed of CPU, RAM and ROM, in addition to a flash EEPROM. For simplicity, the tamper-resistant apparatus 12 is described as an IC card in this embodiment.

The image verification auxiliary apparatus 13 extracts the authentication information from the data to be protected and provides it to the tamper-resistant apparatus 12, when the tamper-resistant apparatus 12 determines the presence or absence of falsification of the data to be protected. The image verification auxiliary apparatus 13 has a function of separating the image file with MAC data into the image data and the MAC data, a function of computing the hash value of separated image data, a function of making the communications with the tamper-resistant apparatus 12, and a function of displaying its determination result. The image verification auxiliary apparatus 13 may be a personal computer (PC) at the Web server that can accumulates and distribute the data, or a miniature instrument having the CPU and memory. For simplicity, the image verification auxiliary apparatus 13 is described as a PC in this embodiment.

The key generation apparatus 14 has a function of managing a secret key safely, a function of encrypting a camera ID inputted using the secret key, and a function of setting the camera ID and encrypted information to the image generation apparatus 11. The key generation apparatus 14 may be a memory card with security function having an arithmetic operation unit composed of CPU, RAM and ROM, or a PC that can protect the secret key information with a password or the access control, in addition to a flash EEPROM. For simplicity, the key generation apparatus 14 is described as a PC in this embodiment.

Figure 2:
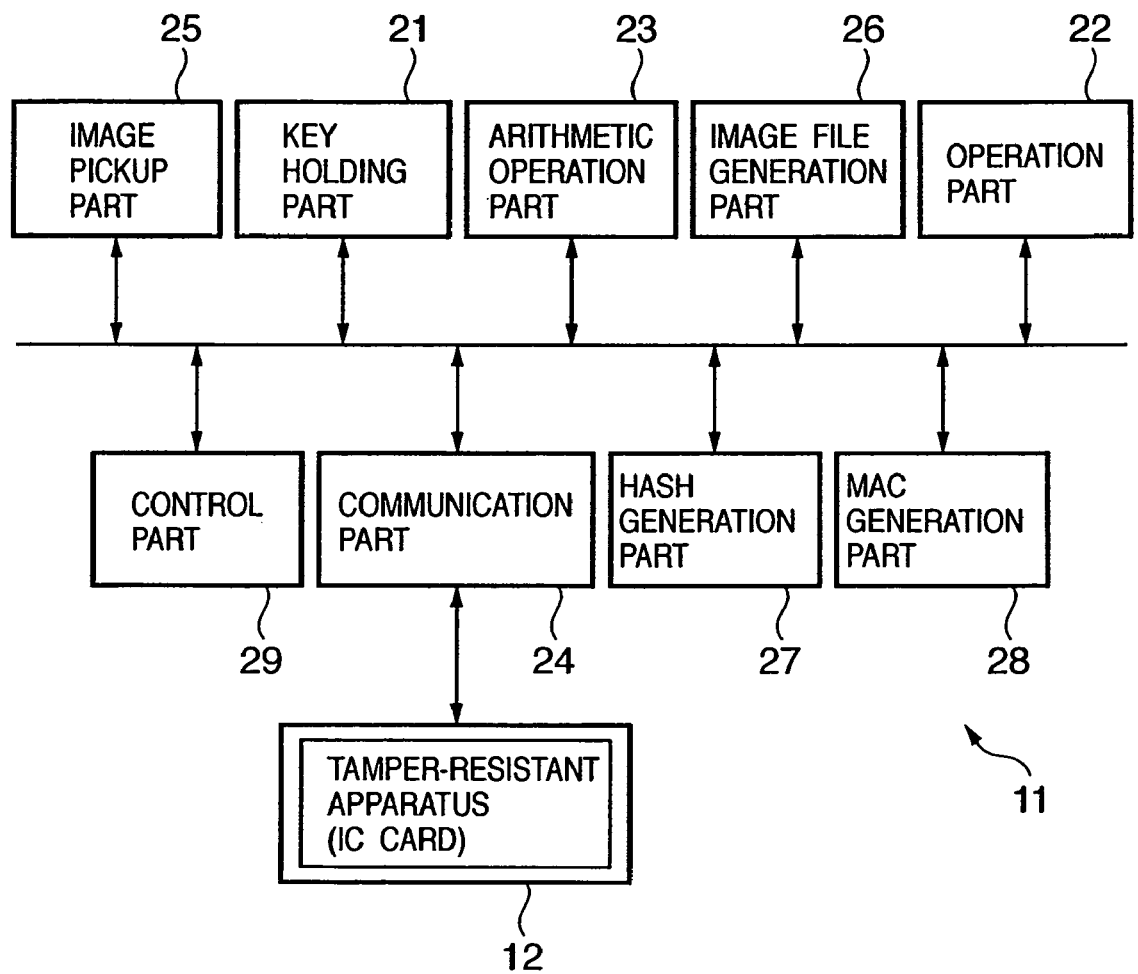
FIG. 2 is a block diagram for explaining a main functional configuration of an image generation apparatus 11 according to a first embodiment.

FIG. 2 is a block diagram showing a configuration example of the image generation apparatus 11. The function of each part will be clear from the explanation of a falsification detection process as will be described later, but is simply described here. The key holding portion 21 holds the encrypted information or the camera ID sent from the key generation apparatus 14, and generates the key based on them. An operation part 22 implements a variety of user operations on the image generation apparatus 11, such as a photographing instruction. An arithmetic operation part 23 performs various arithmetic operations in generating the authentication information. A communication part 24 makes the communications with the tamper-resistant apparatus (IC card) 12. A photographing part 25 has an optical sensor such as a CCD (Charge Coupled Device) to generate the image data of the subject or the auxiliary parameters in accordance with an instruction inputted from the operation part 22. An image file generation part 26 generates an image file by appending the authentication information (MAC in this embodiment) to the image data obtained by the photographing part 25. A hash generation part 27 generates a hash value from the image data. A MAC generation part 28 generates the MAC using the hash value generated by the hash generation part 27 and the key held in the key holding part 21. A control part 29 is composed of CPU, ROM and RAM, and generally controls each of the above-mentioned parts. Each of the parts may be realized by hardware, but partially using the functions of the CPU.

Figure 3:
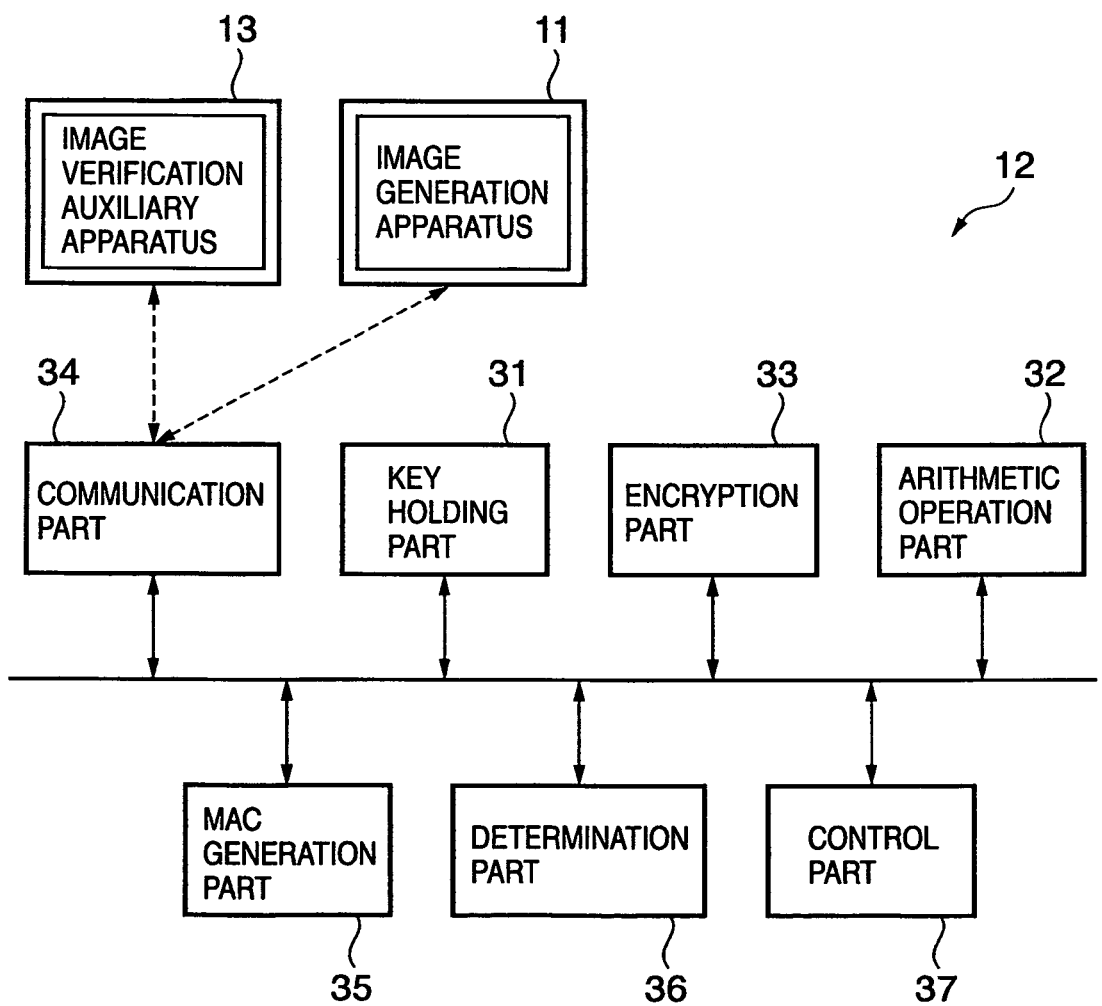
FIG. 3 is a block diagram for explaining a main functional configuration of a tamper-resistant apparatus 12 according to the first embodiment.

FIG. 3 is a block diagram showing a configuration example of the tamper-resistant apparatus (IC card) 12. A key holding part 31 holds the key data for use in an encryption part 33. The key holding part 31 prohibits the reading of key from the outside other than the encryption part 33 to prevent the key information from leaking. An arithmetic operation part 32 performs various arithmetic operations regarding the authentication. The encryption part 33 generates the key data for the authentication process, using the key data held in the key holding part 31. The communication part 34 makes the communications with the image generation apparatus 11 and the image verification auxiliary apparatus 13. A MAC generation part 35 generates the MAC using the key data generated by the encryption part 33. A determination part 36 determines the presence or absence of falsification of the image data by comparing the MAC appended to the image file and the MAC generated by the MAC generation part 35. A control part 37 is composed of CPU, ROM and RAM, and generally controls each of the above-mentioned parts. Each of the parts may be realized by hardware, but partially using the functions of the CPU.

Figure 4:
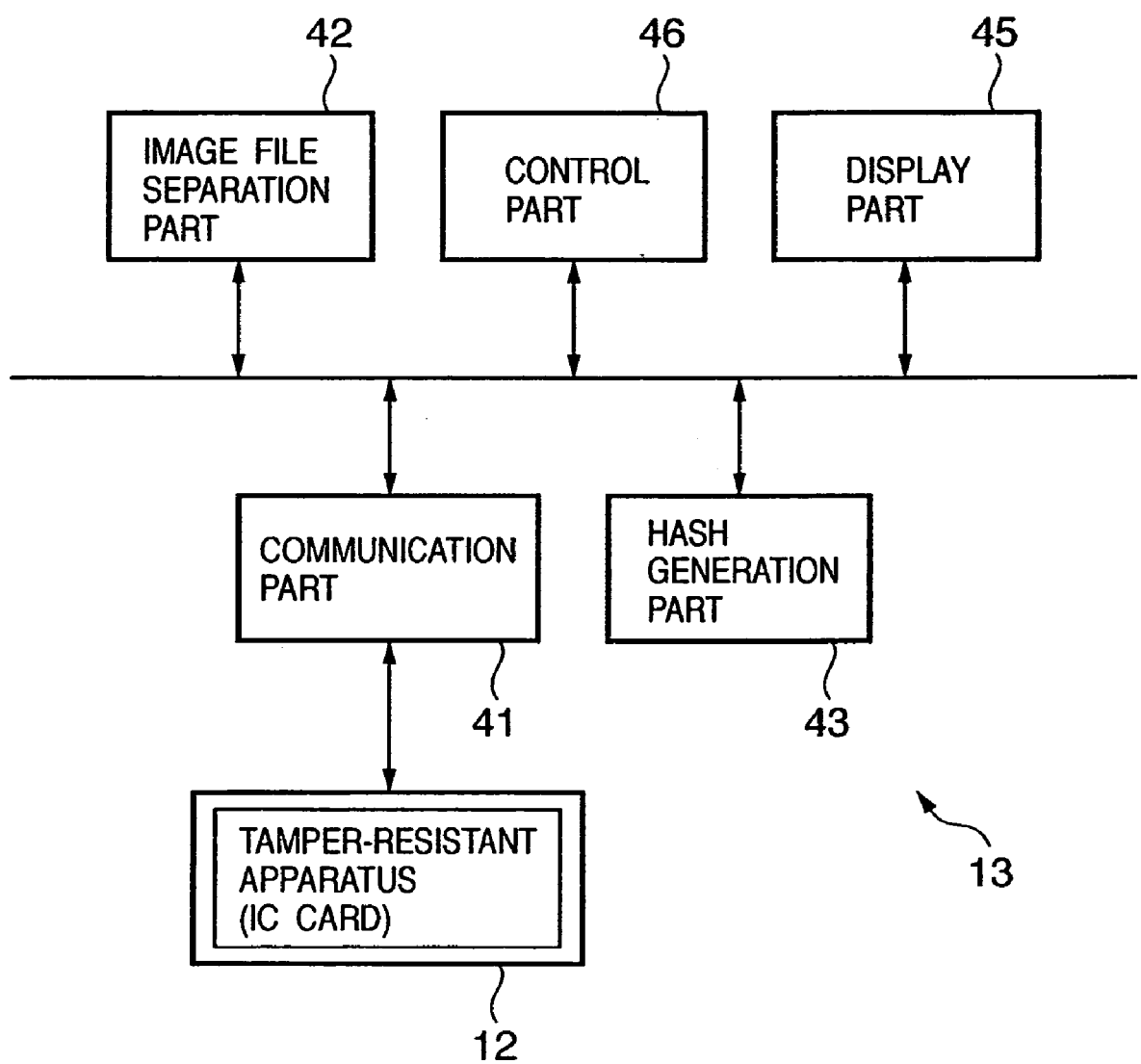
FIG. 4 is a block diagram for explaining a main functional configuration of an image verification auxiliary apparatus 13 according to the first embodiment.

FIG. 4 is a block diagram showing a configuration example of the image verification auxiliary apparatus 13. A communication part 41 makes the communications with the tamper-resistant apparatus 12. An image file separation part 42 separates and extracts the image data and the authentication data from the image file (e.g., image file inputted via the communication part 41 from the tamper-resistant apparatus 12) including the data to be protected. A hash generation part 43 generates the hash value from the image data obtained from the image file separation part 42. A display part 45 displays various kinds of data on a liquid crystal display. A control part 46 controls each of the above-mentioned parts. Each of the parts may be realized by hardware, but partially using the functions of the CPU. Since the image verification auxiliary apparatus 13 is constituted of a PC in this embodiment, each of the parts is implemented by executing a predetermined application program (i.e., the CPU executes a predetermined control program).

Figure 5:
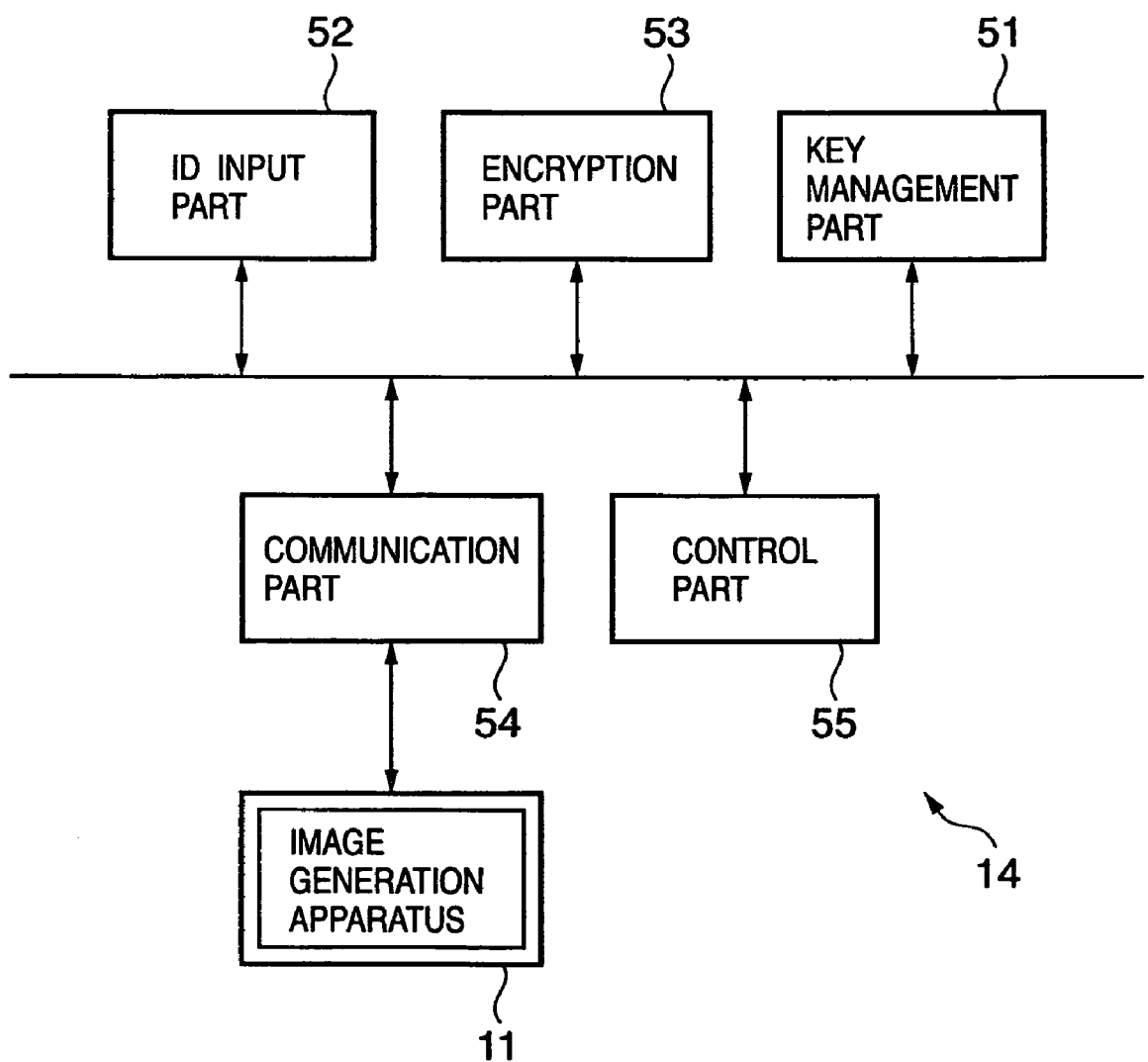
FIG. 5 is a block diagram for explaining a main functional configuration of a key generation apparatus 14 according to the first embodiment.

FIG. 5 is a block diagram showing a configuration example of the key generation apparatus 14. A key management part 51 manages the key data (secret key P) for use in an encryption part 53. An ID input part 52 inputs the unique information (e.g., ID) of the apparatus providing the data to be protected (image generation apparatus 11 in this embodiment). The encryption part 53 mounts a shared key encryption such as AES with safety assured, and encrypts the data from the ID input part 52 using the secret key P. A communication part 54 makes the communications with the image generation apparatus 11 in accordance with a predetermined protocol. A control part 55 controls each of the above-mentioned parts. Each of the parts may be realized by hardware, but partially using the functions of the CPU. Since the key generation apparatus 14 is constituted of a PC in this embodiment, each of the parts is implemented by executing a predetermined application program (i.e., the CPU executes a predetermined control program).

The key management part 51 of the key generation apparatus 14 is limitatively read using a password or the biometrics information by the valid user. That is, the key management part 51 can not be usually read from the outside other than the encryption part 53 to prevent the secret key P from leaking. The ID input part 52 may be a keyboard, or the ID may be acquired from the image generation apparatus 11 via the communication part 54.

[Explanation of Falsification Detection Process]

Figure 6:
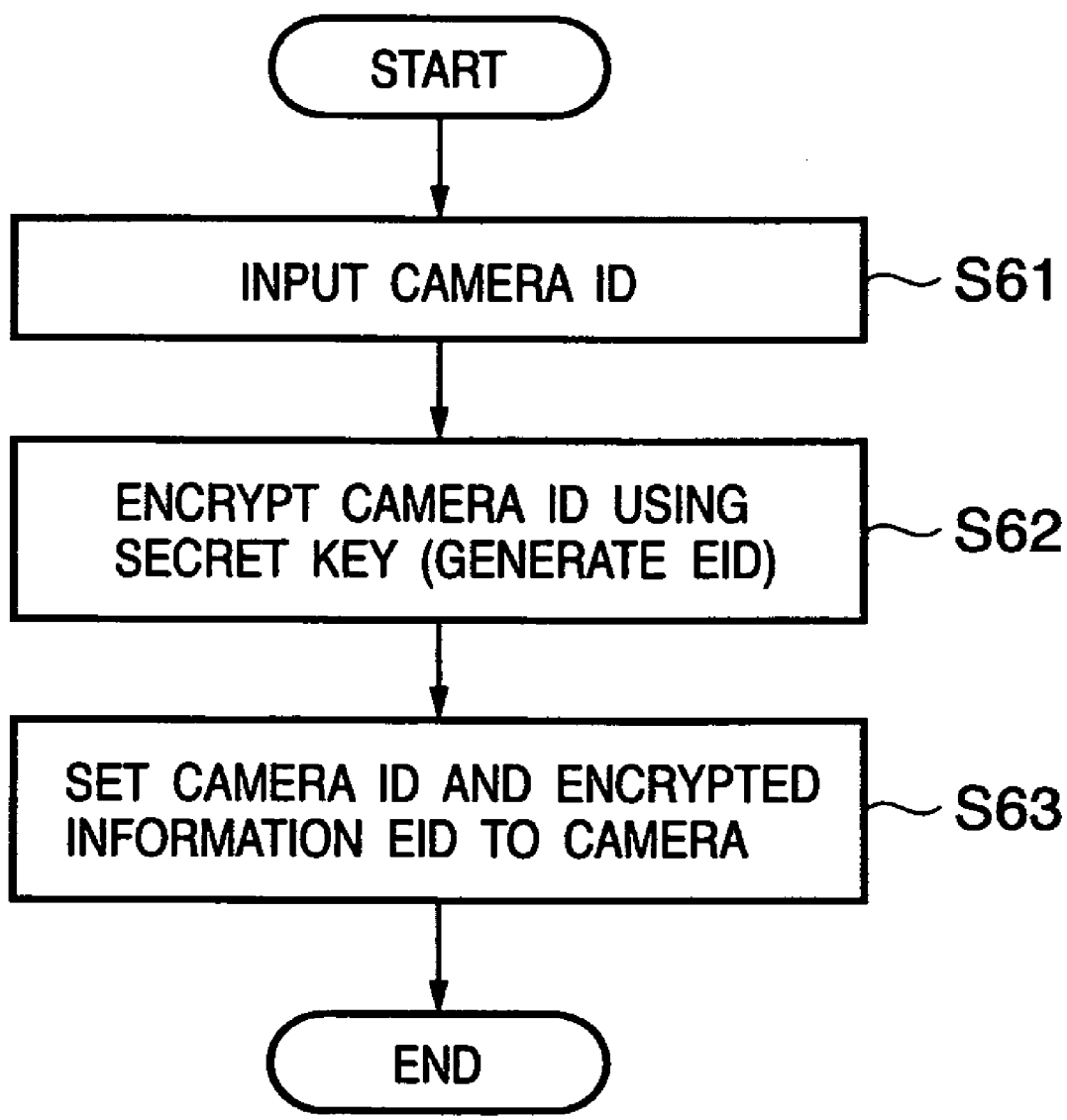
FIG. 6 is a flowchart for explaining a key setting process according to the first embodiment.
Figure 7:
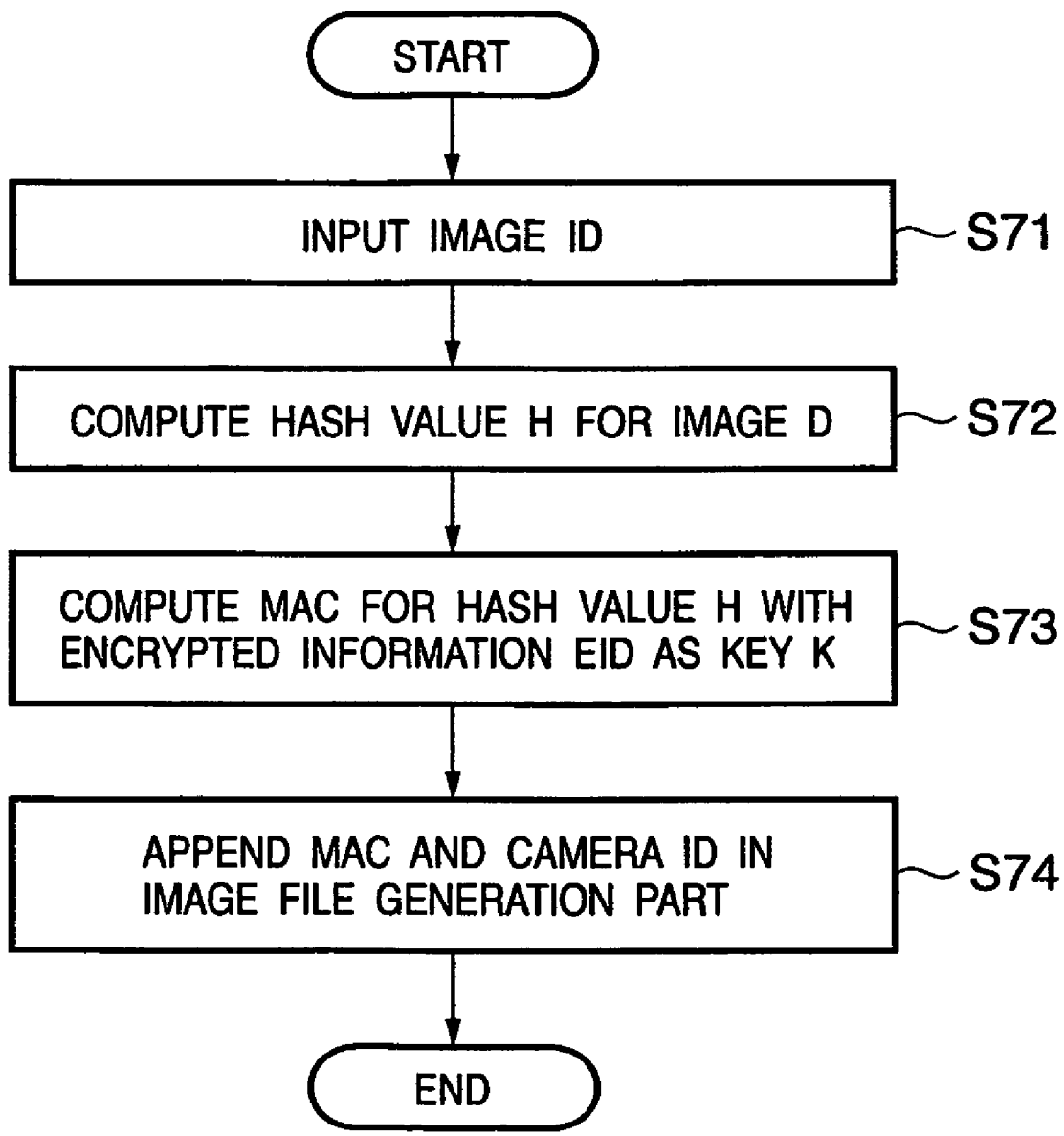
FIG. 7 is a flowchart for explaining a MAC generation process according to the first embodiment.
Figure 9:
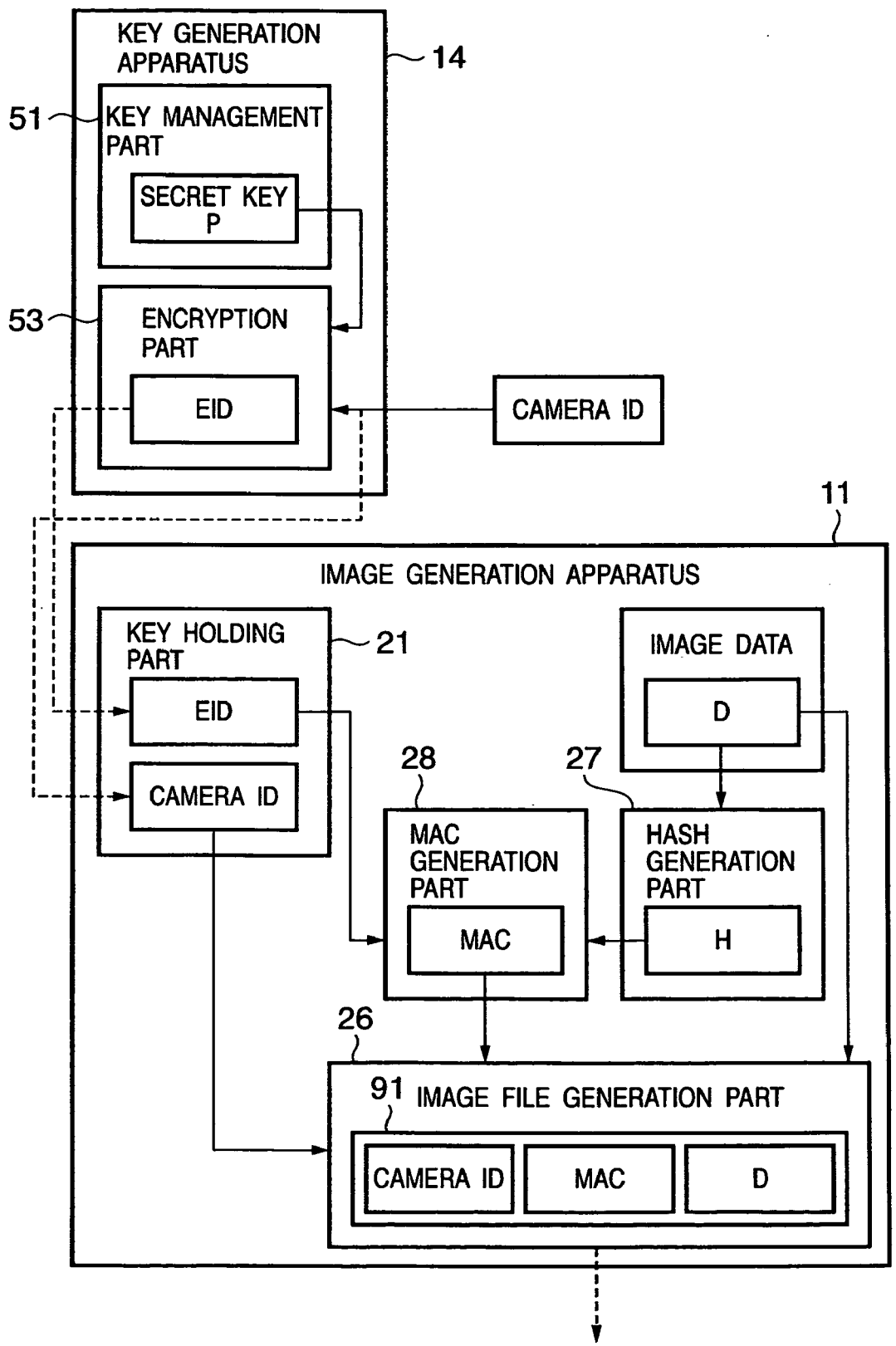
FIG. 9 is a diagram for explaining the data employed and generated in the process as shown in the flowcharts of FIGS. 6 and 7 and its flow.
Figure 10:
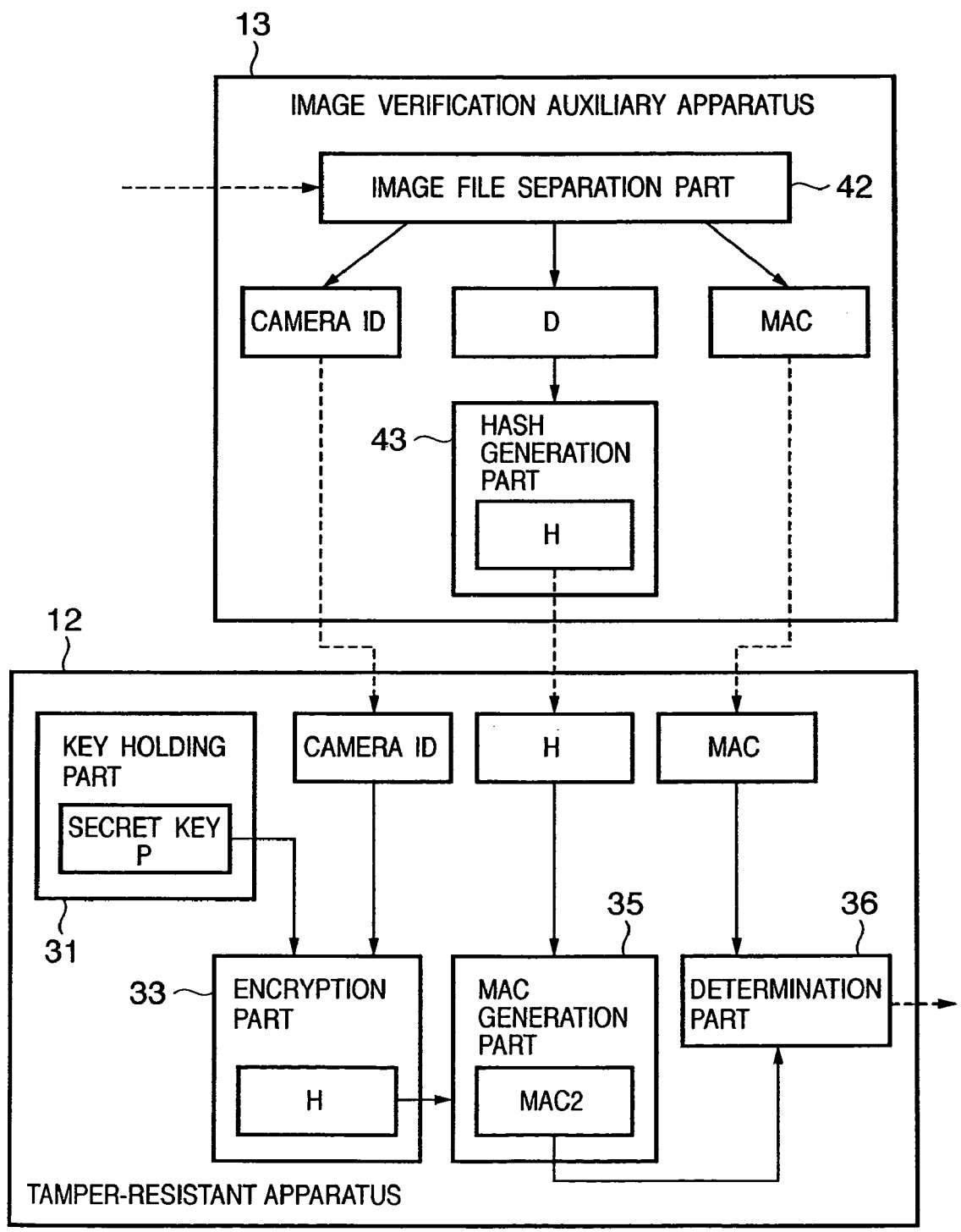
FIG. 10 is a diagram for explaining the data employed and generated in the process as shown in the flowchart of FIG. 8 and its flow.

Referring to FIGS. 6 to 10, a falsification detection process in the system with the above configuration according to this embodiment will be described below in detail. FIG. 6 is a flowchart for explaining a prior process for falsification detection, or a process in which the key generation apparatus 14 sets the information for falsification detection to the image generation apparatus 11. FIG. 7 is a flowchart for explaining a process of generating the image file including the information for falsification detection (authentication information) in the image generation apparatus 11. FIG. 8 is a flowchart for explaining the falsification detection process in the tamper-resistant apparatus 12 and the image verification auxiliary apparatus 13. Also, FIG. 9 is a diagram for explaining the data employed and generated in the process as shown in the flowcharts of FIGS. 6 and 7 and its flow. Similarly, FIG. 10 is a diagram for explaining the data employed and generated in the process as shown in the flowchart of FIG. 8 and its flow.

First of all, it is premised for the process that the key generation apparatus 14 has a preset secret key P in the key management part 51, as shown in FIG. 9. This secret key P, a camera ID and a key K indicate the numerical values, and are set as the numerical values having a predetermined bit length.

Referring to a flowchart of FIG. 6, a procedure for setting the key to the image generation apparatus 11 by the key generation apparatus 14 will be described below. The following process is performed under the control of the control part 55.

First of all, if a unique ID (camera ID) is inputted via the ID input part 52 into the image generation apparatus 11, the camera ID is sent to the encryption part 53 (step S61). The encryption part 53 encrypts the input camera ID, using the secret key P managed and held by the key management part 51, and obtains the EID (step S62). And the camera ID inputted via the ID input part 52 and the EID obtained by encrypting it are transmitted to the image generation apparatus 11 via the communication part 54 (step S63). The transmitted camera ID and EID are received by the image generation apparatus 11 via the communication part 24, and set in the key setting part 21 within the image generation apparatus 11, as shown in FIG. 9. That is, the communication part 24 can communicate with the tamper-resistant apparatus 12 and the key generation apparatus 14. Any communication form may be employed.

Referring to a flowchart of FIG. 7, a process of generating the image file with authentication information (MAC) in the image generation apparatus 11 will be described below. The following process is performed under the control of the control part 29.

The image generation apparatus 11 inputs an image from the photographing part 25 (step S71). The hash generation part 27 computes the hash value H for the image D (step S72). The MAC generation part 28 computes the MAC for the hash value H generated in the hash generation part 27, using, as the key K, the EID held in the key holding part 21 through the process at step S63, as shown in FIG. 9 (step S73). And the image file generation part 26 generates the image file (91 of FIG. 9) with authentication information by appending the MAC and camera ID to the image file of the image D (step S74).

In the above process, it is supposed that the image D obtained from the photographing part 25 is compressed by the image file generation part 26 in accordance with a JPEG method. A file format of the image file in the image file generation part 26 may be JFIF (JPEG File Interchange Format), TIFF (Tagged Image File Format), or GIF (Graphics Interchange Format), for example. However, the file format is not limited to these, but may be extended format, or any other image file format. The hash function for use in the hash generation part 27 may be MD5, SHAI or RIPEMD as generally well known, and any one of them may be employed. A MAC data generation algorithm for the MAC generation part 28 may be implemented by using a CBC (Cipher Block Chaining) mode for shared key encryption such as DES or AES, or using the hash function with key called an HMAC, in which both methods are well known. Any one of these methods may be utilized as the MAC data generation algorithm for the MAC generation part 28. For example, in a CBC mode of DES, the data of interest is encrypted in the CBC mode, and the former half 32 bits of the last block are made MAC data.

Referring to FIGS. 8 and 10, a falsification detection process performed by the tamper-resistant apparatus 12 and the image verification auxiliary apparatus 13 for the image file (91 of FIG. 9) generated in the above way will be described below in detail. It is supposed that the tamper-resistant apparatus (IC card) 12 has a secret key P in the key holding part 31, as shown in FIG. 10.

First of all, the image verification auxiliary apparatus 13 reads an image file including an image D and the MAC and camera ID from the communication part 41 (step S81). The image file separation part 42 of the image verification auxiliary apparatus 13 separates the read image file into the image D and the MAC and camera ID (step S82). Next, the image verification auxiliary apparatus 13 generates the hash value H from the image acquired at step S82, using the hash generation part 43 (step S83). The image verification auxiliary apparatus 13 sends the hash value H generated by the hash generation part 43 and the MAC and camera ID obtained by the image file separation part 42 to the tamper-resistant apparatus 12 via the communication part 41 (step S84). In this embodiment, the communication part 41 comprises an I/O interface with the IC card, because the tamper-resistant apparatus 12 is the IC card.

On the other hand, the tamper-resistant apparatus 12 receives the camera ID, hash value H and MAC via the communication part 34. And the received camera ID is encrypted by the encryption part 33, using the secret key P held in the key holding part 31 (step S91). Herein, an encryption process used by the encryption part 33 is the same as the encryption process used by the encryption part 53. Hence, the EID obtained by encrypting the camera ID in the tamper-resistant apparatus 12 is the same as the EID obtained by encrypting the camera ID in the key generation part 14. And this EID is employed as the key K for MAC computation in the same way as at step S73. That is, the MAC generation part 35 generates the MAC (hereinafter MAC2) for the hash value H sent from the image verification auxiliary apparatus 13, using the EID obtained by the encryption part 33 as the key K (step S92). Herein, the MAC generation part 35 computes the MAC with the shared key encryption such as DES or AES, using the same algorithm as the MAC generation part 28 of the image generation apparatus 11. And the determination part 36 determines whether or not the MAC2 generated by the MAC generation part 35 and the MAC sent from the image verification auxiliary apparatus 13 are matched (step S93). As a result, it is determined that if the MAC and the MAC2 are matched, there is no falsification (step S94), or if they are unmatched, there is any falsification (step S95).

The determination result is sent to the image verification auxiliary apparatus 13 via the communication part 34 (step S96). The image verification auxiliary apparatus 13 displays the sent determination result on the display part 45 (step S85). For example, if the determination part 36 determines that there is no falsification, "no falsification" is displayed, or if there is any falsification, "any falsification" is displayed.

As described above, with the first embodiment, the image generation apparatus (camera) with weak security does not hold the secret key P, whereby the security is improved. Since the tamper-resistant apparatus 12 holds the secret key P, it is possible to make the falsification detection using the same tamper-resistant apparatus 12 (IC card) for all the image generation apparatuses. Also, since the key is customized for each image generation apparatus (camera), the keys of the other image generation apparatuses (cameras) are secure even if one image generation apparatus (camera) is known.

Second Embodiment

Though the key generation apparatus 14 sets the camera ID and its encrypted information or EID to the camera 11 in the first embodiment, the correspondence between the camera ID and EID may leak, if the key generation apparatus 14 is bad in management. In a second embodiment, the configuration of setting separate secret information A to the key holding part 21 for each user to further improve the security will be described. Also, in the second embodiment, such a configuration is provided that a random number generated for each photographing is used to change the key for MAC, thereby further increasing the security. However, the secret information A is information that is set to the key holding part 21 by the user separately using the operation part 22. Further, it is supposed here that the secret information A is also set in the key holding part 31 of the tamper-resistant apparatus 12, and managed safety.

The image generation apparatus 11, the tamper-resistant apparatus 12, the image verification auxiliary apparatus 13 and the key generation apparatus 14 according to the second embodiment have the same configuration as those of the first embodiment (FIGS. 1 to 5). Referring to the flowcharts of FIGS. 11 to 13, and the data flows of FIGS. 14 and 15, a falsification detection process according to the second embodiment will be described below.

Figure 11:
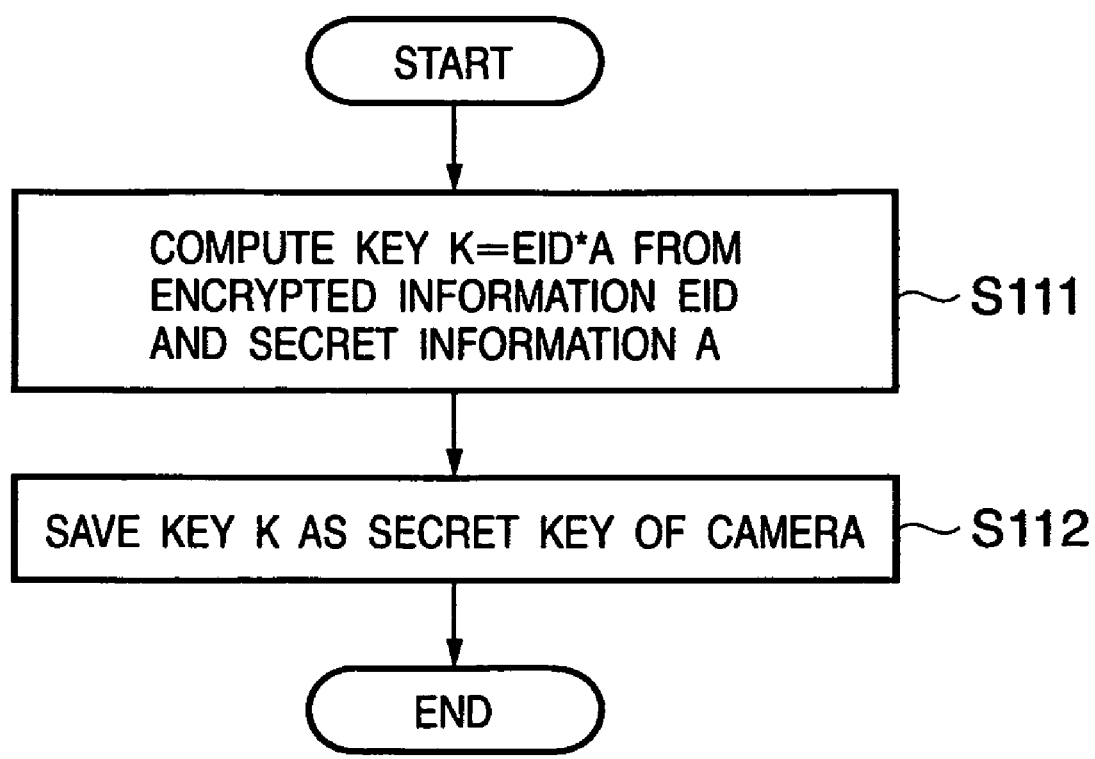
FIG. 11 is a flowchart for explaining the key setting process according to a second embodiment of the invention.
Figure 14:
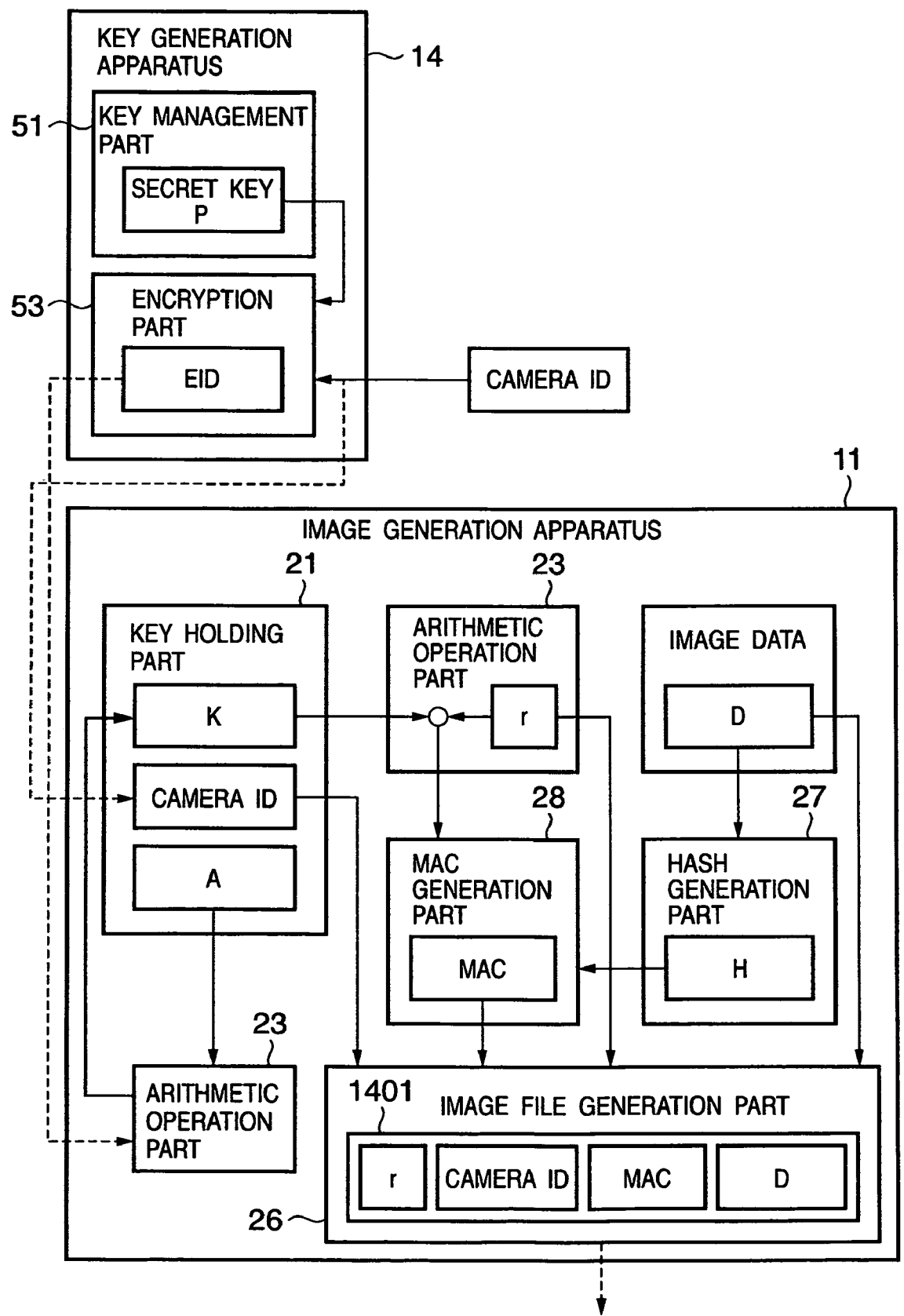
FIG. 14 is a diagram for explaining the data employed and generated in the process as shown in the flowcharts of FIGS. 11 and 12 and its flow.

The operation of the key generation apparatus 14 is the same as described in the first embodiment (FIG. 6). The arithmetic operation part 23 of the image generation apparatus 11 generates the key K from the encrypted information EID from the key generation apparatus 14 and the secret information A, and holds it in the key holding part 21. That is, if the EID of encrypted information is received from the key generation apparatus 14, the image generation apparatus 11 computes EID*A in the arithmetic operation part 23, and makes it the key K, as shown in FIGS. 11 and 14 (step S111). And this key K is held as the new key in the key holding part 21 (step S112).

Figure 12:
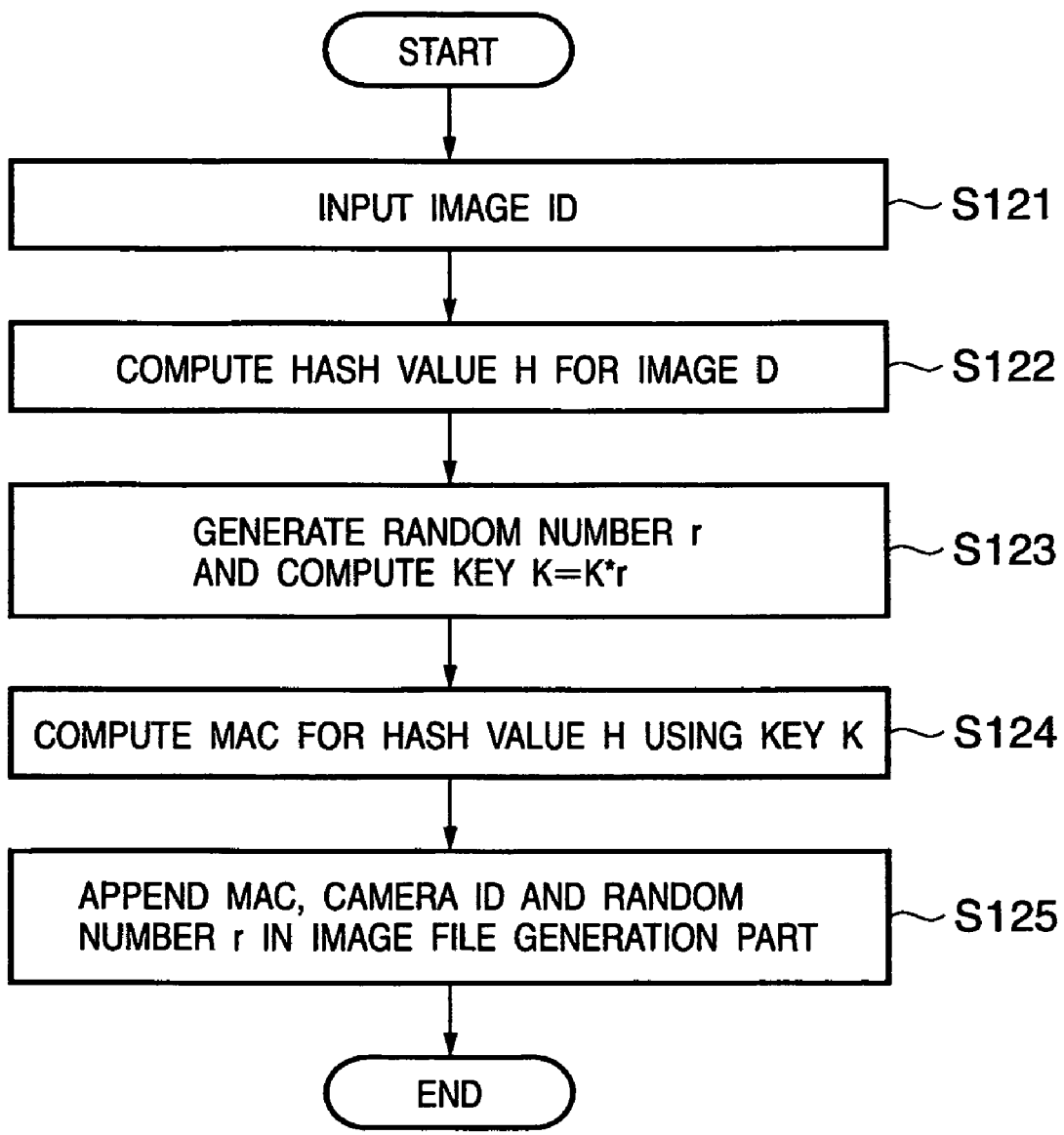
FIG. 12 is a flowchart for explaining the MAC generation process according to the second embodiment.

Referring to FIGS. 12 and 14, a MAC generation process of the image generation apparatus 11 will be described below. First of all, the image generation apparatus 11 inputs an image D from the photographing part 25 (step S121). Next, the hash value H for the image D is computed using the hash generation part 27 (step S122). The image generation apparatus 11 generates the random number r in the arithmetic operation part 23 at every time of photographing. And the key K=K*r for photographing is computed in the arithmetic operation part 23, using the key K held in the key holding part 21 at step S112 and the random number r (step S123). Using the key K (=EID*A*r) computed in this way, the MAC for the hash value H is generated through the same process at step S54 (step S124). And the image file generation part 26 of the image generation apparatus 11 generates an image file 1401 by appending the MAC and camera ID and the random number r generated at step S123 to the image file of the image D (step S125).

Figure 13:
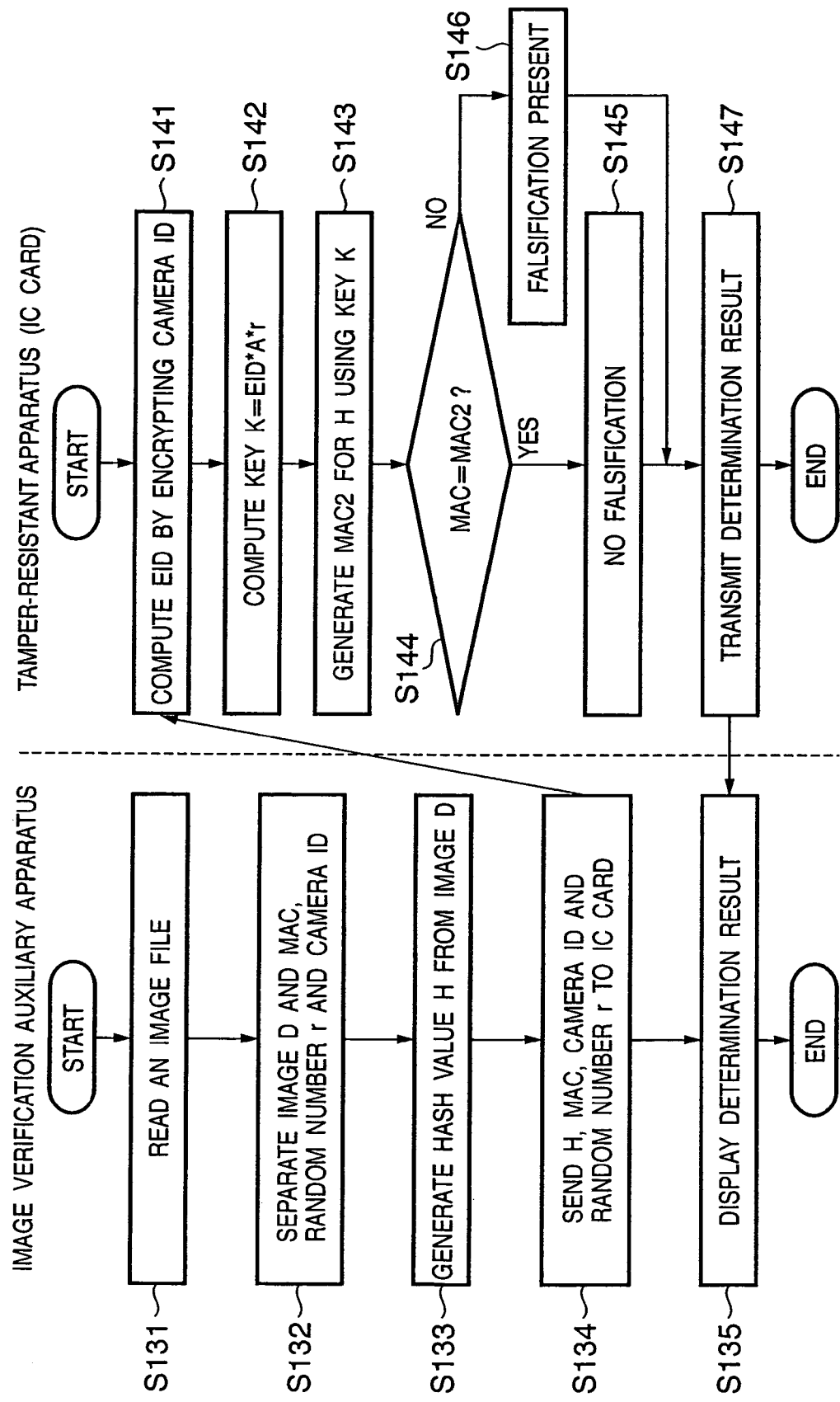
FIG. 13 is a flowchart for explaining the MAC verification process according to the second embodiment.

Referring to a flowchart of FIG. 13, a falsification detection process (MAC verification process) according to the second embodiment will be described below.

Figure 15:
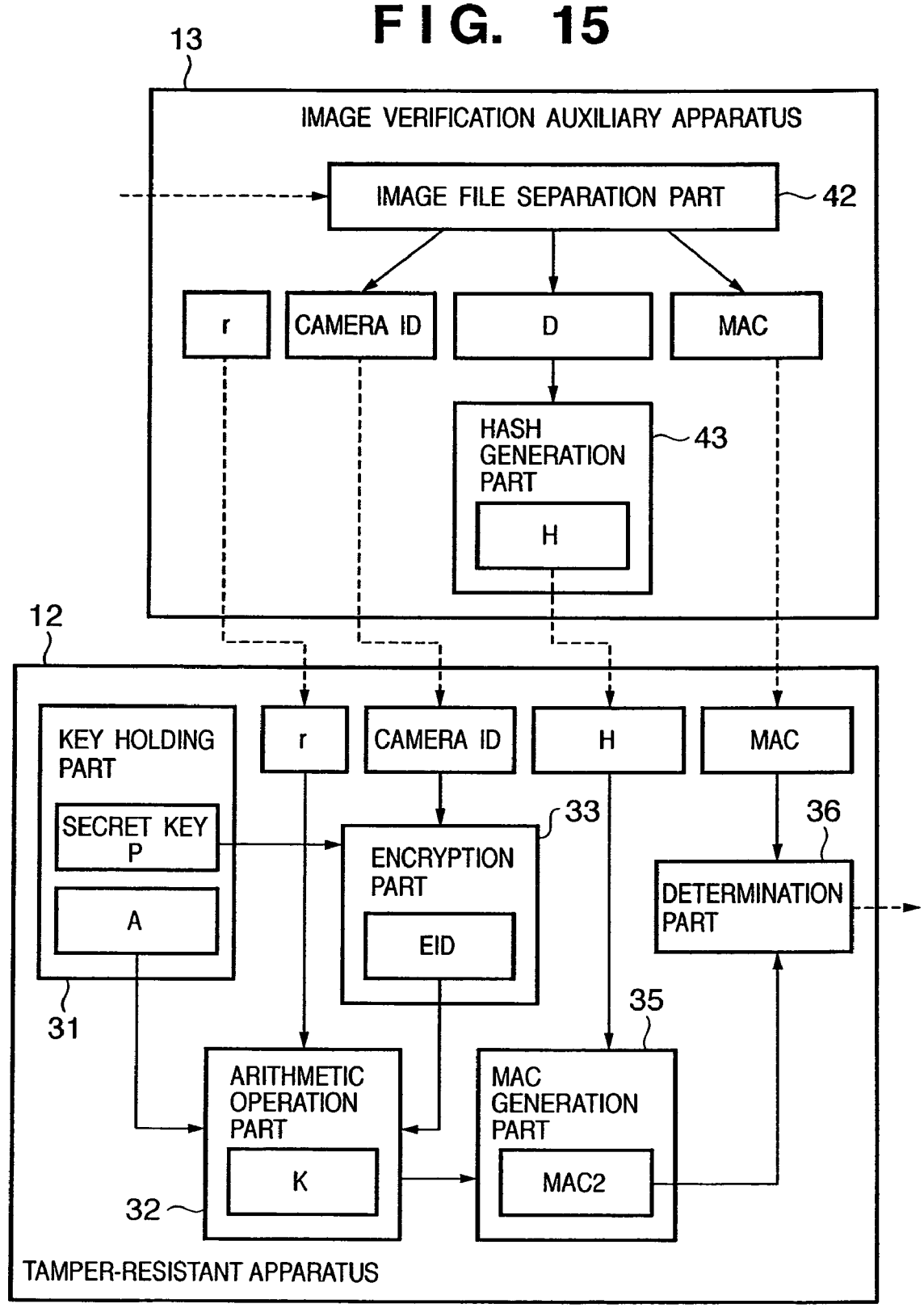
FIG. 15 is a diagram for explaining the data employed and generated in the process as shown in the flowchart of FIG. 13 and its flow.

The image verification auxiliary apparatus 13 reads an image file including an image D, the MAC and camera ID and the random number r from the communication part 41 (step S131). The image file separation part 42 of the image verification auxiliary apparatus 13 separates the read image file into the image D, the MAC, the camera ID and the random number r, as shown in FIG. 15 (step S132). Next, the image verification auxiliary apparatus 13 generates the hash value H from the image D using the hash generation part 43 (step S133). And the image verification auxiliary apparatus 13 sends the generated hash value H and the separated MAC, camera ID and random number-r to the tamper-resistant apparatus 12 via the communication part 41 (step S134).

The tamper-resistant apparatus 12 encrypts the camera ID sent via the communication part 34 in the encryption part 33, using the secret key P held in the key holding part 31, to obtain the EID (step S141). Herein, an encryption process used in the encryption part 33 is the same as the encryption process used in the encryption part 53 of the key generation apparatus 14. Next, the arithmetic operation part 32 computes the key K (=EID*A*r) for the image D obtained through the process at step S111 and step S123 (step S142). The key K thus obtained is employed for the MAC computation. That is, the MAC generation part 35 generates the MAC (hereinafter MAC2) for the hash value H sent from the image verification auxiliary apparatus 13, using the K obtained at step S142 (step S143). The determination part 36 determines whether or not the MAC2 generated by the MAC generation part 35 and the MAC sent from the image verification auxiliary apparatus 13 are matched (step S144). And it is determined that if the MAC and the MAC2 are matched, there is no falsification (step S145), or if they are unmatched, there is any falsification (step S146).

The determination result is sent to the image verification auxiliary apparatus 13 via the communication part 34 (step S147). The image verification auxiliary apparatus 13 displays the sent determination result on the display part 45 (step S135). For example, if the determination part 36 determines that there is no falsification, "no falsification" is displayed, or if there is any falsification, "any falsification" is displayed.

Both the secret information A and the random number r are not necessarily set, but either the secret information A or the random number r may be only set. For example, if the secret information A is only used, step S123 of FIG. 12 is not required, whereby MAC is generated using the key K=EID*A at step S124. Since the random number r does not exist, the process at steps S132 and S134 in FIG. 13 is the same as the process at steps S82 and S84 in the first embodiment (FIG. 8). Further, the key K=EID*A is employed at step S142. On the other hand, if the random number r is only set, the process at step S111 in FIG. 11 is not required, whereby the EID is held as the key K in the key holding part 21. Also, the key K=EID*r is computed through the process at step S142 in FIG. 13.

The mode in which the secret information A is only used, the mode in which the random number r is only used, and the mode in which both the secret information A and the random number r are used may be switched at will.

Though in the above embodiment, the key K generated in the image generation apparatus 11 is held in the key holding part 21, the invention is not limited to this form. For example, EID*A or EID*A*r may be computed every time the MAC is generated.

As described above, with the second embodiment, there is the effect that the security is further improved because the key K is generated by processing the EID using the secret information A, in addition to the effect of the first embodiment. Also, the key is changed using the random number r every time of generating the authentication information (MAC) for the data to be protected (image data), whereby the security is improved. The random number r may be set for each image or each user. Further, though r is the random number here, r may be the value set at every time of photographing, or for each image or user, other than the random number.

Third Embodiment

Though the MAC is used in the first and second embodiments, a digital signature with public key encryption is used in a third embodiment. The system configuration is the same as in the first embodiment (FIG. 1). Also, the configuration of the image verification auxiliary apparatus 13 is the same as in the first embodiment (FIG. 4), and the illustration and explanation thereof is omitted. However, if the public key encryption is used, the key for verification can be public and so the tamper-resistant apparatus 12 can be unnecessary. In this case, it is possible to inquire of the server that manages the public key corresponding to the camera ID and directly perform verification by the image verification auxiliary apparatus 13. In the following, the case where the tamper-resistant apparatus 12 is used as apparatus for generating and managing the public key and as a verification apparatus will be described.

Figure 16:
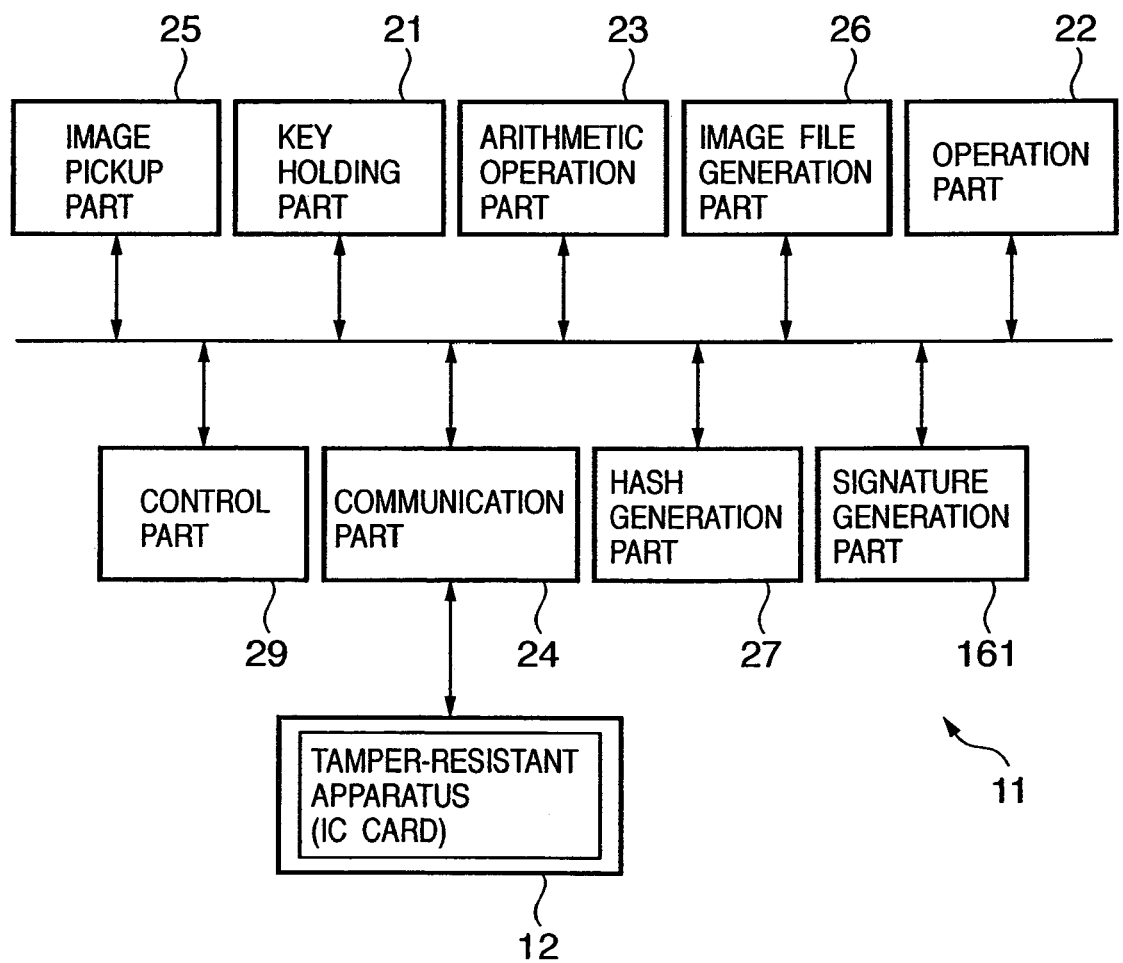
FIG. 16 is a block diagram for explaining a main functional configuration of the image generation apparatus 11 according to a third embodiment.

FIG. 16 is a block diagram showing a configuration of the image generation apparatus 11 according to the third embodiment. The same or like parts are designated by the same reference numerals as in the first embodiment (FIG. 2). A signature generation part 161 generates the signature data based on the hash value H generated by the hash generation part 27 and the key data held in the key holding part 21.

Figure 17:
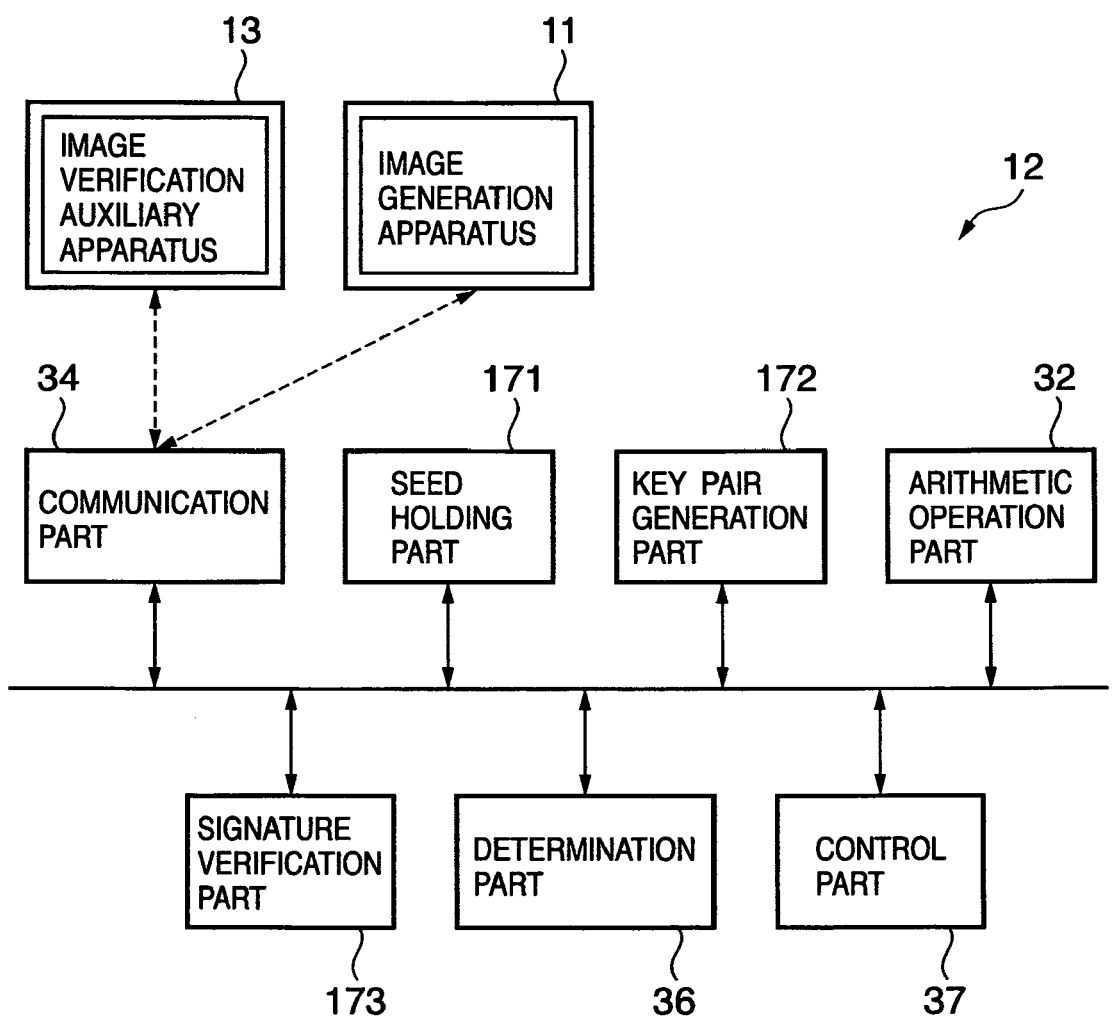
FIG. 17 is a block diagram for explaining a main functional configuration of the tamper-resistant apparatus 12 according to the third embodiment.

FIG. 17 is a block diagram showing a configuration of the tamper-resistant apparatus 12 according to the third embodiment. The same or like parts are designated by the same reference numerals as in the first embodiment (FIG. 3). A seed holding part 171 holds a seed value. A key pair generation part 172 generates a pair of keys (public key, secret key), using the seed value held in the seed holding part 171 and the camera ID. A signature verification part 173 verifies the signature data, using the public key generated by the key pair generation part 172.

Figure 18:
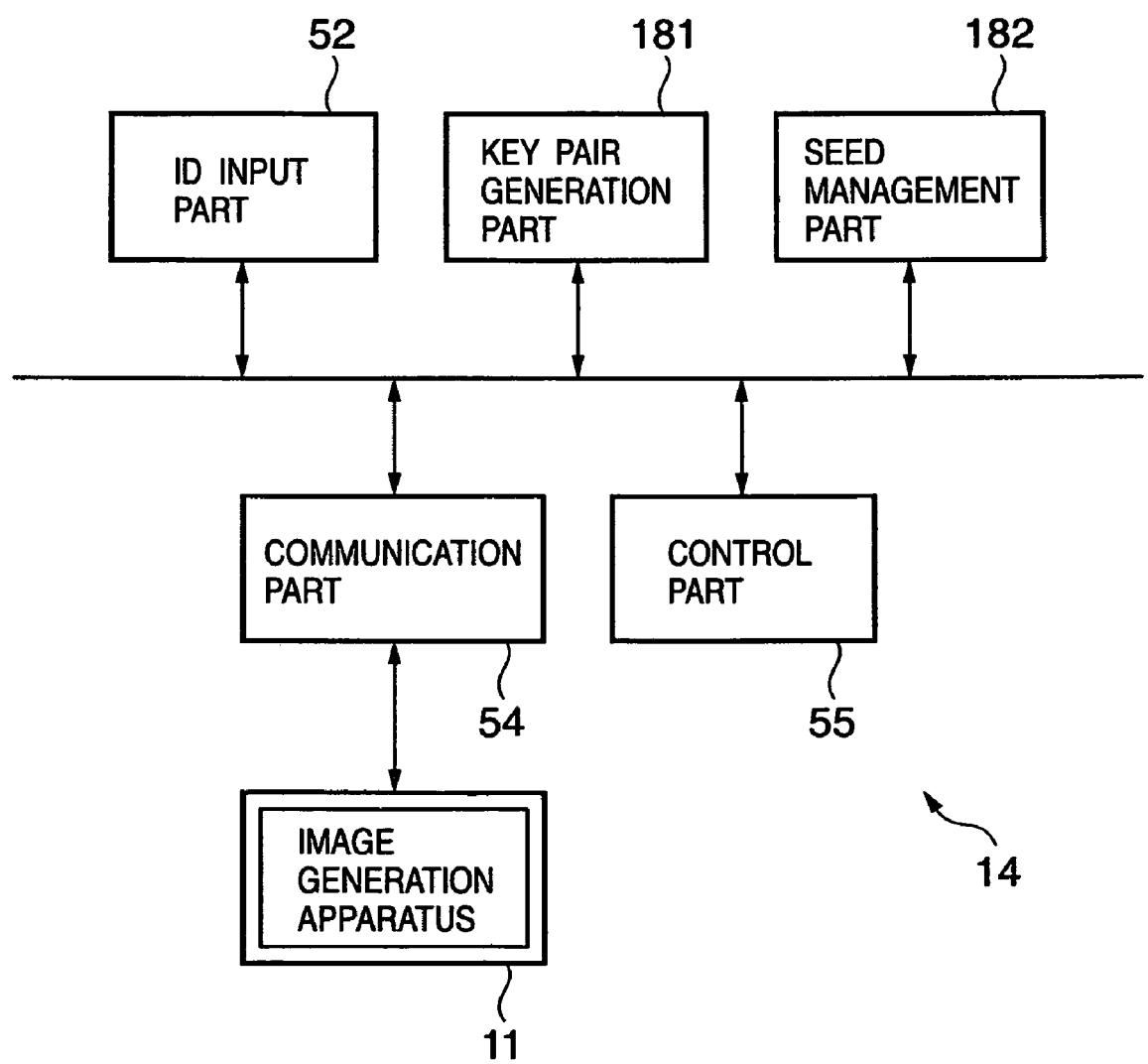
FIG. 18 is a block diagram for explaining a main functional configuration of the key generation apparatus 14 according to the third embodiment.

FIG. 18 is a block diagram showing a configuration of the key generation apparatus 14 according to the third embodiment. The same or like parts are designated by the same reference numerals as in the first embodiment (FIG. 5). A key pair generation part 181 generates a pair of keys (public key, secret key) based on the seed value managed and held in a seed management part 182 and the camera ID inputted via the ID input part 52. The seed management part 182 manages the seed value (numerical value having a predetermined number of bits) safely in the same way as the key management part 51 manages the secret key P in the first embodiment. That is, the seed management part 182 is limitatively read using a password or the biometrics information by the valid user. And the seed management part 182 prohibits the reading of key from the outside other than the key pair generation part 181 to prevent the seed value from leaking. It is supposed that the key pair generation part 123 computes the pair of keys, using a well-known key pair computation algorithm for the public key. In the following, the seed value is designated by seed S.

Referring to the flowcharts of FIGS. 19 to 21 and the data flow diagrams of FIGS. 22 and 23, a falsification detection process for the system with the above configuration according to the third embodiment will be described below.

Figure 19:
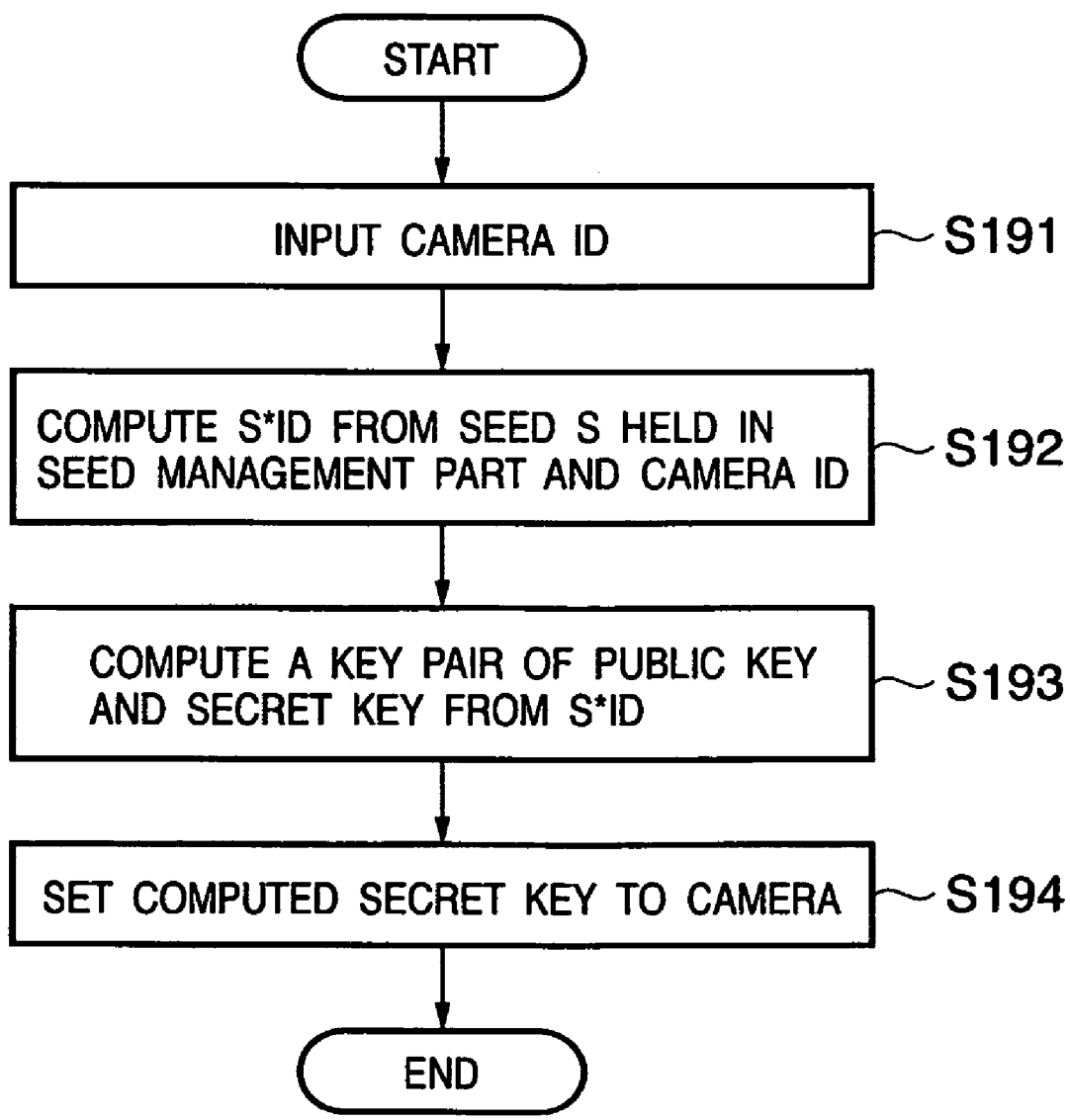
FIG. 19 is a flowchart for explaining the key setting process according to the third embodiment.

FIG. 19 is a flowchart showing a procedure of the key generation process in the key generation apparatus 14 according to the third embodiment. First of all, if the camera ID that is different for every camera is inputted by the ID input part 52, the input camera ID is sent to the key pair generation part 181 (step S191). The key pair generation part 181 computes the product S*ID of the seed S held in the seed management part 182 and the camera ID (step S192). And the key pair generation part 181 computes a key pair of public key and secret key for the public key encryption from the computed S*ID (step S193). The secret key of the key pair computed at step S193 is sent to the image generation apparatus 11 via the communication part 54 (step S194). The sent secret key is set to the key holding part 21 of the key generation apparatus 11, as shown in FIG. 22.

Figure 20:
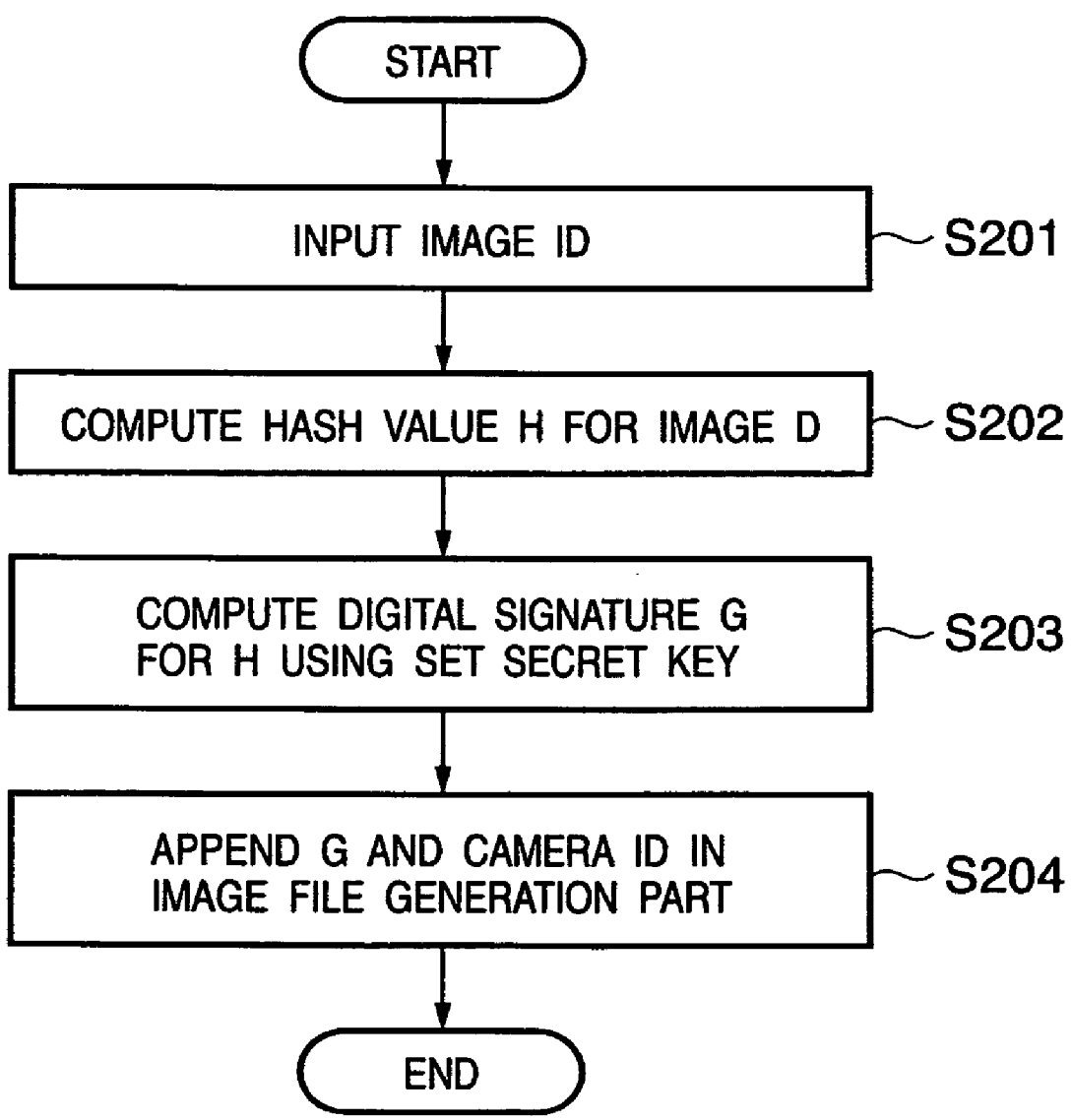
FIG. 20 is a flowchart for explaining a signature generation process according to the third embodiment.

FIG. 20 is a flowchart for explaining a process of generating the image file including the information (signature information) for falsification detection in the image generation apparatus 11.

The image generation apparatus 11 inputs an image D from the photographing part 25 (step S201). Next, the hash generation part 27 computes the hash value H for the image D (step S202). Next, the signature generation part 161 computes the digital signature G for the hash value H obtained in the hash generation part 27, using the secret key held in the key holding part 21 (step S153). The image file generation part 26 generates an image file 221 by appending the signature G generated by the signature generation part 161 and the camera ID to the image file of the image D (step S154). A digital signature generation algorithm for the signature generation part 161 may use the public key encryption such as an RSA encryption.

Figure 21:
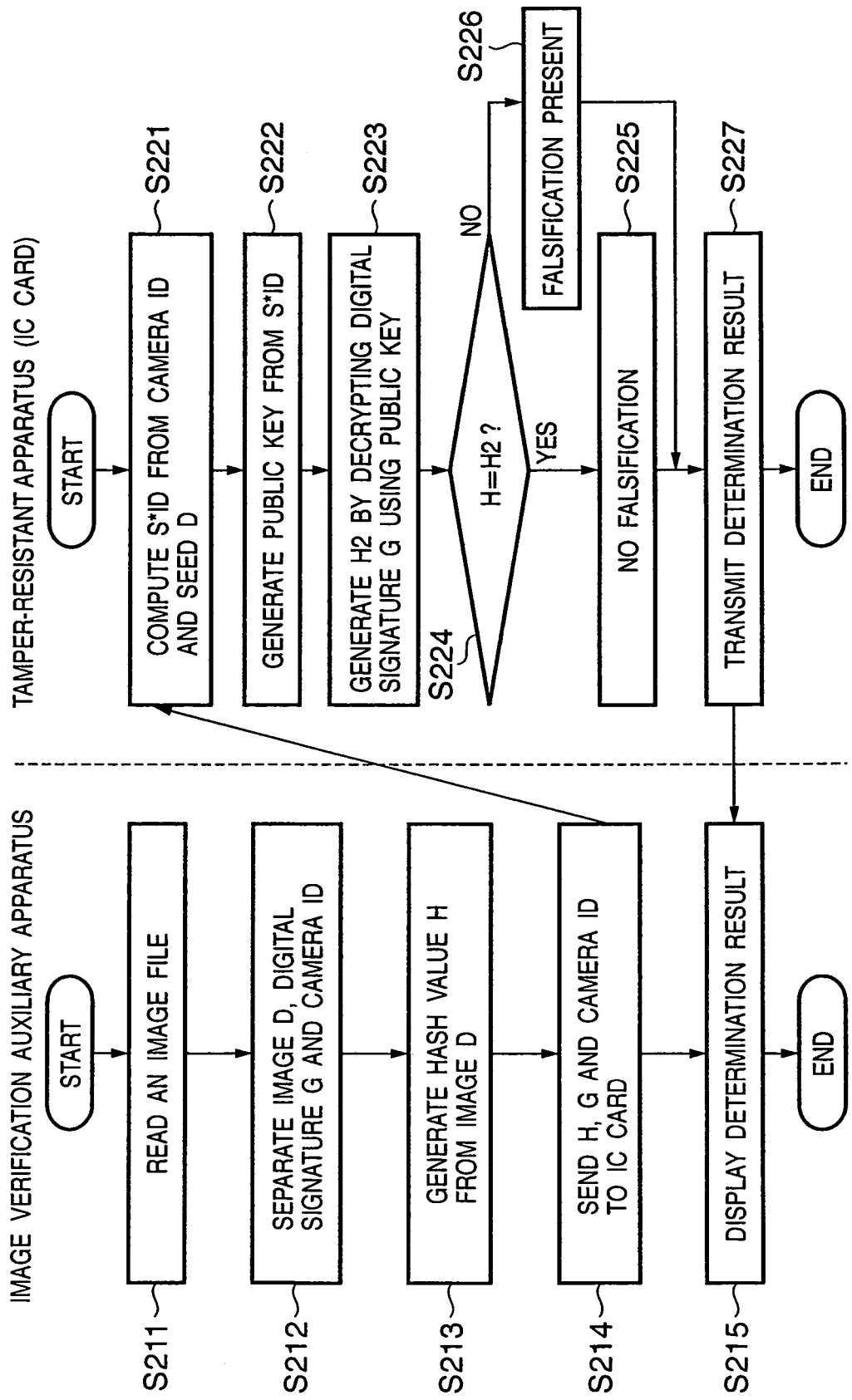
FIG. 21 is a flowchart for explaining a signature verification process according to the third embodiment.
Figure 22:
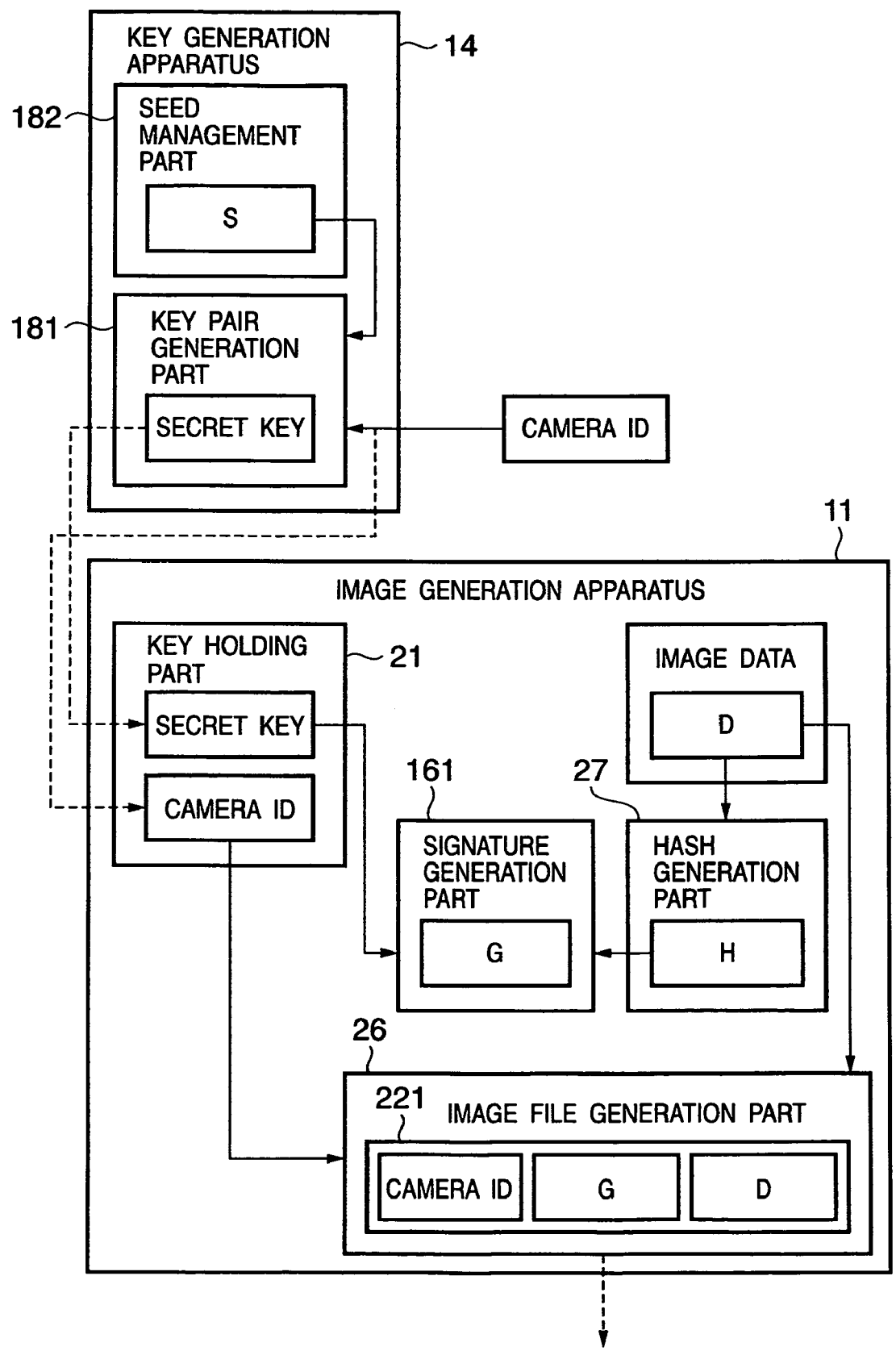
FIG. 22 is a diagram for explaining the data employed and generated in the process as shown in the flowcharts of FIGS. 19 and 20 and its flow.
Figure 23:
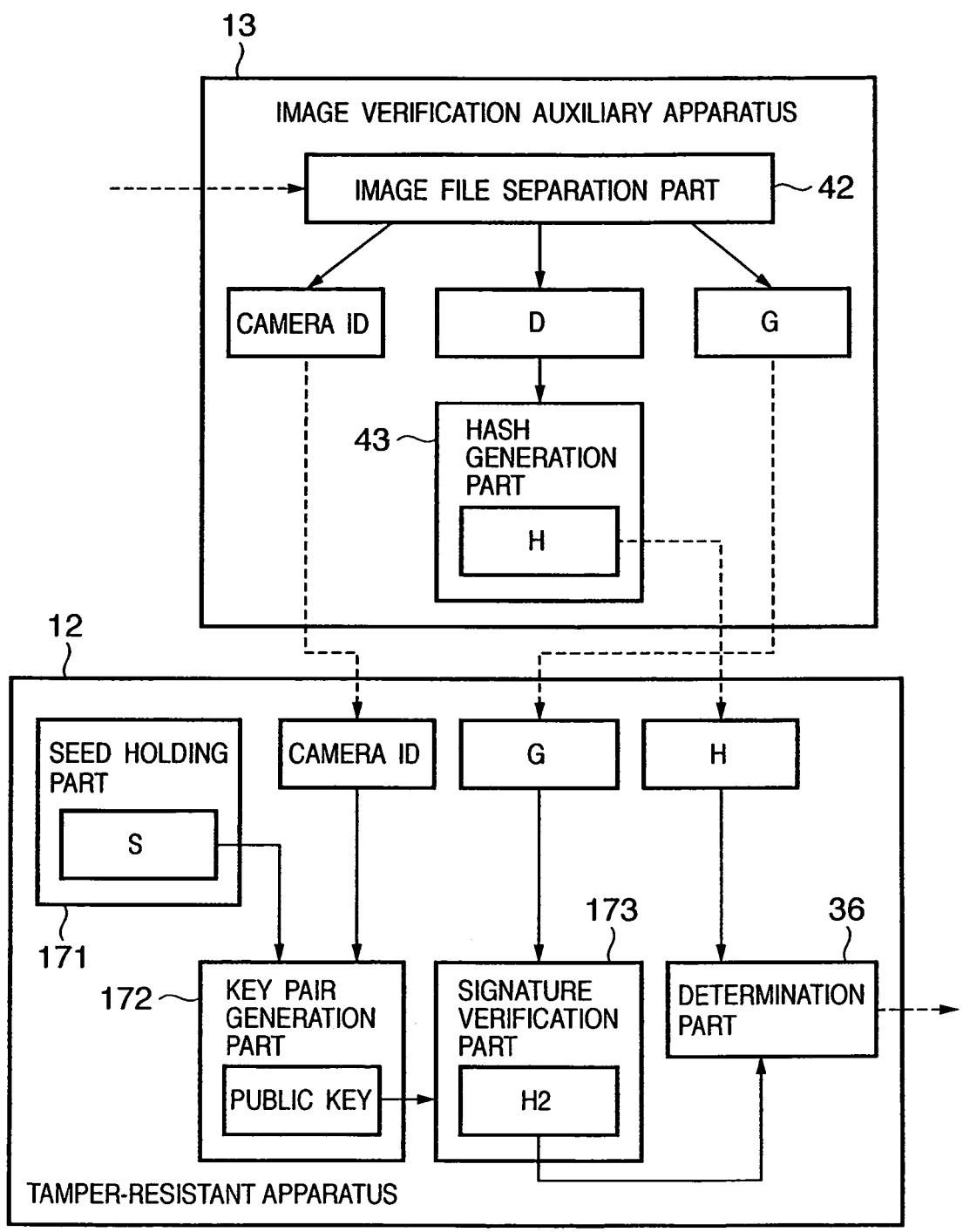
FIG. 23 is a diagram for explaining the data employed and generated in the process as shown in the flowchart of FIG. 21 and its flow.

Referring to FIGS. 21 and 23, a falsification detection process performed by the tamper-resistant apparatus 12 and the image verification auxiliary apparatus 13 for the image file (221 in FIG. 22) generated in the above way will be described below. The tamper-resistant apparatus (ID card) 12 safely holds the seed S in the seed holding part 171, as shown in FIG. 23. This seed S is the same as the seed S managed by the seed management part 182 of the key generation apparatus 14. The seed holding part 171 may have the same configuration as the seed management part 182. Also, the key pair generation part 172 may have the same configuration as the key pair generation part 181 of the key generation apparatus 13. Moreover, the signature verification part 173 has a signature verification algorithm corresponding to the signature generation part 161 of the image generation apparatus 11.

Referring to a flowchart of FIG. 21, a procedure of signature verification by the tamper-resistant apparatus 12 and the image verification auxiliary apparatus 13 according to the third embodiment will be described below.

First of all, the image verification auxiliary apparatus 13 reads an image file including an image D and the signature G and camera ID from the communication part 41 (step S211). The image file separation part 42 of the image verification auxiliary apparatus 13 separates the read image file into the image D and the signature data G and camera ID (step S212). The image verification auxiliary apparatus 13 generates the hash value H from the image D, using the hash generation part 43 (step S213). The image verification auxiliary apparatus 13 sends the hash value H and the separated G and camera ID to the tamper-resistant apparatus 12 via the communication part 41 (step S214).

In the tamper-resistant apparatus 12, the key pair generation part 172 computes S*ID, using the camera ID sent via the communication part 44 and the seed S held in the seed holding part 171 (step S221). And the key pair generation part 172 generates a pair of keys for public key encryption from the computed S*ID (step S222). Herein, the key pair generation algorithm used herein is the same as in the key pair generation part 181 of the key generation apparatus 14. Hence, if S*ID of a key pair generation source is equal, the key pair obtained by the key pair generation part 181 of the key pair generation apparatus 14 and the key pair obtained by the key pair generation part 172 of the tamper-resistant apparatus 12 are the same. That is, the public key computed by the tamper-resistant apparatus 12 is generated as the key paired with the secret key computed by the key generation apparatus 14.

Next, the signature verification part 173 generates H2 by decoding the signature G, using the public key generated at step S222 (step S223). And the determination part 36 determines whether or not H2 generated at step S223 and H sent from the image verification auxiliary apparatus 13 are matched (step S224). And it is determined that if H and H2 are matched, there is no falsification (step S225), or if they are unmatched, there is any falsification (step S226).

The determination result is sent to the image verification auxiliary apparatus 13 via the communication part 34 (step S227). The image verification auxiliary apparatus 13 displays the sent determination result on the display part 45 (step S215). For example, if the determination part 36 determines that there is no falsification, "no falsification" is displayed, or if there is any falsification, "any falsification" is displayed.

As described above, with each of the above embodiments, the vulnerability in the security of the image generation apparatus is removed, and the security performance is improved. It is possible to provide the system capable of handling the verification data for all the cameras with one IC card.

Though in the third embodiment, the secret key is employed to generate the signature G and the public key is employed to verify the signature G, the public key may be employed to generate the cryptograph G and the secret key may be employed to decode the cryptograph G in the case of encryption.

As described above, with the third embodiment, there is the effect that the digital signature with the public key encryption can be employed for falsification detection of the data to be protected, in addition to the effect of the first embodiment.

[Various Modifications]

Various modifications regarding the first to third embodiments will be described below.

In the first and second embodiments, the MAC data generation process is performed using only the image data of the subject, but the invention is not limited to this form. For example, for the information corresponding to meta-data of the image data, such as the auxiliary parameters (e.g., photographing time, focal distance, f-number, ISO speed, photometry mode, image file size, photographer information and so on), the MAC data is generated in the same way as the image data. Accordingly, the same MAC verification process of the image data can be implemented for the auxiliary parameters. The image data and the meta-data are binary data (digital data). Accordingly, it is apparent that the above process can be implemented by replacing the image data with meta-data, that is, switching the image data to the meta-data to be inputted into the hash generation part 27. Also, the switching of data may be made upon an instruction from the user.

In making the verification by appending the MAC to the auxiliary parameters as described above, the image D may be replaced with the auxiliary parameters in the process as shown in FIGS. 7 and 8. Also, if the MAC is changed to the digital signature, it is clear that the auxiliary parameters can be verified with the public key encryption.

Though in the first embodiment, the MAC verification process is decomposed into the image verification auxiliary apparatus 13 (PC) and the tamper-resistant apparatus 12 (IC card), the image verification auxiliary apparatus 13 and the tamper-resistant apparatus 12 may be integrated as the verification apparatus. In this case, the falsification for the image can be verified by inputting only the image file generated in the image file generation part 26 from the image generation apparatus 11 into the verification apparatus. Also, in this case, the process as shown in FIG. 8 is performed within one apparatus, and it is unnecessary to distinguish between the image verification auxiliary apparatus 13 and the tamper-resistant apparatus 12.

Though in the second embodiment (FIGS. 11 to 13), K=K*X is employed as the arithmetic operation of generating the new key, other functions may be employed. That is, the key may be calculated as K=f(K,X). For example, K=K+X.

The above modification may be similarly implemented for the third embodiment with the public key encryption.

The object of the invention may be also achieved by supplying a recording medium (or storage medium) recording the program code of software implementing each function of the embodiments to the system or apparatus, in which the computer (or CPU or MPU) in the system or apparatus reads and executes the program code stored in the recording medium. In this case, the program code itself read from the recording medium may implement each function of the embodiments, and the recording medium recording the program code may constitute the invention.

In the above embodiments, each function may be implemented in such a way that the computer reads and executes the program code, or the operating system (OS) operating on the computer performs all or a part of the actual process based on the instructions of the program code.

Moreover, in the above embodiments, each function may be implemented by writing the program code read from the recording medium into a function extension card inserted into the computer, or a memory equipped for a function extension unit connected to the computer, in which the CPU provided for the function extension card or the function extension unit performs all or a part of the actual process, based on the instructions of the program code.

When the invention is applied to the recording medium, the recording medium may store the program codes corresponding to the flowcharts as described previously.

With the invention, the security performance for falsification of data is improved.

As many apparently widely different embodiments of the present invention can be made without departing from the spirit and scope thereof, it is to be understood that the invention is not limited to the specific embodiments thereof except as defined in the appended claims.

This application claims the benefit of Japanese Application No. 2005-047601 filed Feb. 23, 2005, which is hereby incorporated by reference herein in its entirety.

What is claimed is:

1. A falsification detection apparatus for detecting the presence or absence of falsification of data to be protected that is provided by an information processing apparatus for providing data including information for falsification detection, including an acquisition unit configured to acquire from an external apparatus secret data obtained by an arithmetic operation using unique information of the information processing apparatus and a secret key or seed information managed secretly in the external apparatus, a holding unit configured to acquire and hold secretly key data based on the secret data acquired by the acquisition unit, a generation unit configured to generate authentication data based on data to be protected and the key data held in the holding unit, and a providing unit configured to provide the unique information and the authentication data together with the data to be protected, said falsification detection apparatus comprising:

a first holding unit configured to hold the secret key secretly;

a first generation unit configured to generate the key data using the unique information of the information processing apparatus that provides the data to be protected and the secret key;

a second generation unit configured to generate authentication data using the key data generated by said first generation unit and derived data acquired by applying a hash function to the data to be protected; and a determination unit configured to determine the presence or absence of falsification of the data to be protected by comparing the authentication data generated by said second generation unit and the authentication data added to the data to be protected by the providing unit.

2. The information processing apparatus according to claim 1, wherein said first holding unit further holds secretly secret information unique to each user owned by the information processing apparatus, and said first generation unit generates the key data using the unique information of the information processing apparatus, the secret key and the secret information unique to a user.

3. The falsification detection apparatus according to claim 1, wherein said second generation unit changes the key data using information set in accordance with an input image or a user's setting added to the data to be protected.

4. A falsification detection apparatus for detecting the presence or absence of falsification of data to be protected that is provided by an information processing apparatus for providing data including information for falsification detection, including an acquisition unit configured to acquire from an external apparatus secret data obtained by an arithmetic operation using unique information of the information processing apparatus and a secret key or seed information managed secretly in the external apparatus, a holding unit configured to acquire and hold secretly key data based on the secret data acquired by the acquisition unit, a generation unit configured to generate authentication data based on data to be protected and the key data held in the holding unit, and a providing unit configured to provide the unique information and the authentication data together with the data to be protected, said falsification detection apparatus comprising:

a first holding unit configured to hold the seed information secretly;

a first generation unit configured to generate a public key or the secret key for public key encryption as key data using the unique information of the information processing apparatus that provides the data to be protected and the seed information held by said first holding unit;

a decoding unit configured to decode the authentication data added to the data to be protected by the providing unit using the key data generated by said first generation unit; and a determination unit configured to determine the presence or absence of falsification of the data to be protected by comparing the data acquired by said decoding unit and derived data acquired by applying a hash function to the data to be protected.

5. The falsification detection apparatus according to claim 4, wherein the key data generated by said first generation unit is a public key and the authentication data is signature data.

6. A falsification detection method for detecting the presence or absence of falsification of data to be protected that is provided from a providing apparatus executing an information processing method for providing data including information for falsification detection, including a holding step of acquiring secret data from an external apparatus obtained by an arithmetic operation using unique information of an apparatus and secret key or seed information managed secretly in the external apparatus and holding secretly key data based on the secret data in a memory, a generation step of generating authentication data based on data to be protected and the key data held in memory, and a providing step of providing the unique information and the authentication data together with the data to be protected, said falsification detection method comprising:

a first holding step of secretly holding the secret key in a memory;

a first generation step of generating the key data using the unique information of the providing apparatus that provides the data to be protected and the secret key held in the memory;

a second generation step of generating authentication data using the key data generated at said first generation step and derived data acquired by applying a hash function to the data to be protected; and a determination step of determining the presence or absence of falsification of the data to be protected by comparing the authentication data generated at said second generation step and the authentication data added to the data to be protected by the providing step.

7. A falsification detection method for detecting the presence or absence of falsification of data to be protected that is provided by a providing apparatus executing an information processing method for providing data including information for falsification detection, including a holding step of acquiring secret data from an external apparatus obtained by an arithmetic operation using unique information of an apparatus and secret key or seed information managed secretly in the external apparatus and holding secretly key data based on the secret data in a memory, a generation step of generating authentication data based on data to be protected and the key data held in memory, and a providing step of providing the unique information and the authentication data together with the data to be protected, said falsification detection method comprising:

a first holding step of secretly holding the seed information in a memory;

a first generation step of generating a public key or the secret key for public key encryption as key data using the unique information of the providing apparatus that provides the data to be protected and the seed information;

a decoding step of decoding the authentication data added to the data to be protected by the providing step using the key data generated by said first generation step; and a determination step of determining the presence or absence of falsification of the data to be protected by comparing the data acquired at said decoding step and derived data acquired by applying a hash function to the data to be protected.

8. A falsification detection method comprising:

a supply step of supplying a data providing apparatus with secret data generated by performing an encryption process using a secret key held secretly in a falsification detection apparatus and unique information of the data providing apparatus;

in the data providing apparatus, a first holding step of secretly holding in a memory key data based on the secret data supplied at said supply step;

a first generation step of generating authentication data based on the data to be protected and the key data held in memory;

a providing step of providing the unique information and the authentication data together with the data to be protected;

in the falsification detection apparatus, a second holding step of secretly holding the secret key in a memory;

a second generation step of generating key data using the unique information provided at said providing step and the secret key;

a third generation step of generating authentication data that is the same or is not the same as the authentication data provided at said providing step using the key data generated in said second generation step and derived data acquired by applying a hash function to the data to be protected; and a determination step of determining the presence or absence of falsification of the data to be protected by comparing the authentication data generated at said third generation step and the authentication data provided at said providing step.

9. A storage medium storing a control program for causing a computer to execute the detection method according to claim 6.

* * * * *